(12) United States Patent
Cooper et al.

(10) Patent No.: US 8,931,233 B2
(45) Date of Patent: Jan. 13, 2015

(54) BUILDING FRAME

(76) Inventors: Paul Alan Cooper, Redland Bay (AU);
Pierre Camilleri, Alexandra Hills (AU)

( * ) Notice: Subject to any disclaimer, the term of this patent is extended or adjusted under 35 U.S.C. 154(b) by 0 days.

(21) Appl. No.: 13/574,318

(22) PCT Filed: Jan. 18, 2011

(86) PCT No.: PCT/AU2011/000048
§ 371 (c)(1),
(2), (4) Date: Jul. 20, 2012

(87) PCT Pub. No.: WO2011/088502
PCT Pub. Date: Jul. 28, 2011

(65) Prior Publication Data
US 2012/0272607 A1    Nov. 1, 2012

(30) Foreign Application Priority Data

Jan. 21, 2010 (AU) .................. 2010900225
Aug. 3, 2010 (AU) .................. 2010903461

(51) Int. Cl.
*E04C 3/04* (2006.01)
*E04B 1/24* (2006.01)
*E04C 3/40* (2006.01)
*F16B 7/18* (2006.01)

(52) U.S. Cl.
CPC ... *E04B 1/24* (2013.01); *E04C 3/40* (2013.01);
*E04B 2001/2409* (2013.01); *E04B 2001/2415*
(2013.01); *E04B 2001/2418* (2013.01); *E04B
2001/2439* (2013.01); *E04B 2001/2445*
(2013.01); *E04B 2001/2448* (2013.01); *E04B
2001/2457* (2013.01); *E04B 2001/2487*
(2013.01); *F16B 7/18* (2013.01)
USPC .......................... 52/655.1; 52/653.1; 52/843

(58) Field of Classification Search
CPC ........ E04B 2001/24–2001/2496; E04B 1/185;
E04B 1/2403; F16B 3/02; F16B 3/025
USPC ............ 52/653.1, 655.1, 93.1, 843, 844, 845;
248/205.1
See application file for complete search history.

(56) References Cited

U.S. PATENT DOCUMENTS 2,175,453 A * 10/1939 Wilkins .................. 403/256
3,524,378 A    8/1970 Wieber
3,929,311 A   12/1975 Solo
(Continued)

FOREIGN PATENT DOCUMENTS

EP    2092995 A2    8/2009
GB    2138912 A    10/1984
(Continued)

*Primary Examiner* — Andrew J Triggs
(74) *Attorney, Agent, or Firm* — Kirton McConkie; Evan R. Witt

(57) ABSTRACT

A joint (8, 6, 7A, 7C, 8A, 8B, 11A, 9A, 9B, 9C) for connection of mutually adjacent structural members (11A, 11B), (11, 12), (12, 14), (11, 13), (11, 11), (11, 12), characterized in that each structural member has a pair of opposed walls (18, 19, 20, 21), (24, 24, 22A, 22A), (50, 51, 52A, 52A), (50, 51, 52C, 52C), (99, 100, 24, 24), (99, 102, 24, 24), (102, 102, 24, 24) whereby in formation of said joint (8, 6, 7A, 7C, 8A, 8B, 11A, 9A, 9B, 9C) each opposed wall (18, 19), (24, 24), (50, 51), (99, 100), (99, 102), (102, 102) of one structural member (11A, 11, 12) is located adjacent to a proximal opposed wall (20, 21), (22A, 22A), (24, 24) of another structural member (11B, 12, 14, 13, 11) and connected thereto by fasteners (26, 17A, 17B).

23 Claims, 46 Drawing Sheets

(56) References Cited

U.S. PATENT DOCUMENTS

| | | | | |
|---|---|---|---|---|
| 4,069,638 | A * | 1/1978 | Hasselqvist et al. | 52/843 |
| 4,315,386 | A * | 2/1982 | Clarke | 52/93.1 |
| 5,451,116 | A * | 9/1995 | Czachor et al. | 403/338 |
| 6,276,094 | B1 * | 8/2001 | Hays | 52/79.1 |
| 6,276,111 | B1 * | 8/2001 | Pittman et al. | 52/741.1 |
| 6,385,941 | B1 * | 5/2002 | Power et al. | 52/844 |
| 6,389,770 | B1 * | 5/2002 | Santavicca | 52/474 |
| 6,450,415 | B1 * | 9/2002 | Kirchner et al. | 238/315 |
| 6,755,004 | B1 * | 6/2004 | Power et al. | 52/845 |
| 6,854,237 | B2 * | 2/2005 | Surowiecki | 52/633 |
| 7,047,703 | B2 * | 5/2006 | Waldrop | 52/843 |
| 7,591,442 | B2 * | 9/2009 | Dinh et al. | 248/73 |
| 7,739,841 | B1 * | 6/2010 | Puckett | 52/93.1 |
| 7,877,962 | B2 * | 2/2011 | Teffenhart, Jr. | 52/844 |
| 8,468,775 | B2 * | 6/2013 | Vaughn | 52/843 |
| 2002/0116893 | A1 * | 8/2002 | Waldrop | 52/731.4 |
| 2005/0229528 | A1 * | 10/2005 | Kardosz et al. | 52/639 |
| 2008/0040997 | A1 * | 2/2008 | Klein | 52/241 |
| 2008/0178551 | A1 * | 7/2008 | Porter | 52/653.1 |
| 2008/0190068 | A1 * | 8/2008 | Tapscott et al. | 52/690 |
| 2009/0051093 | A1 * | 2/2009 | Klippel et al. | 269/216 |
| 2011/0113725 | A1 * | 5/2011 | Garry | 52/838 |
| 2012/0272607 | A1 * | 11/2012 | Cooper et al. | 52/655.1 |

FOREIGN PATENT DOCUMENTS

| | | |
|---|---|---|
| GB | 2187408 A | 9/1987 |
| JP | 11280748 A | 10/1999 |
| WO | 0183906 A1 | 11/2001 |

* cited by examiner

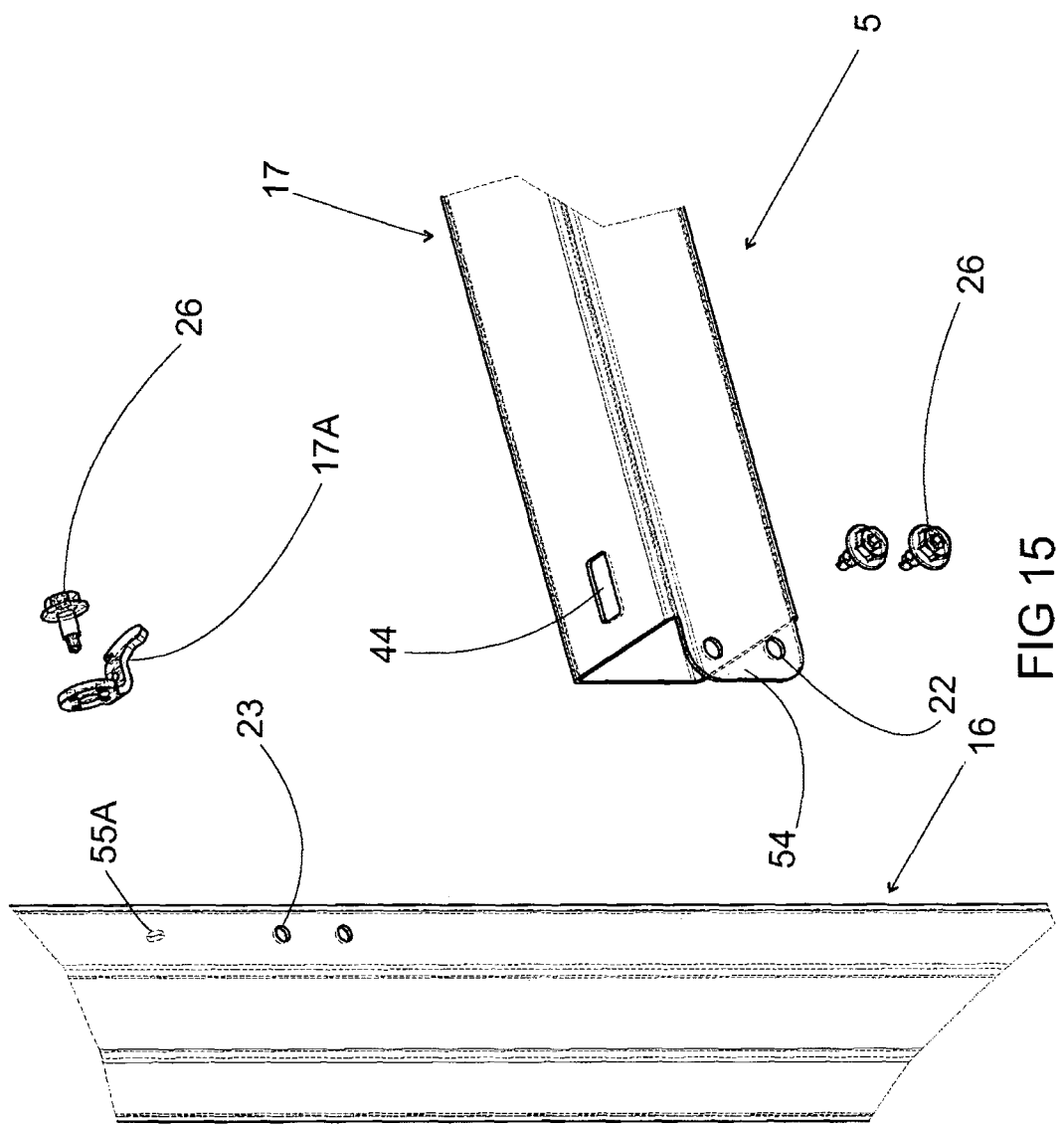

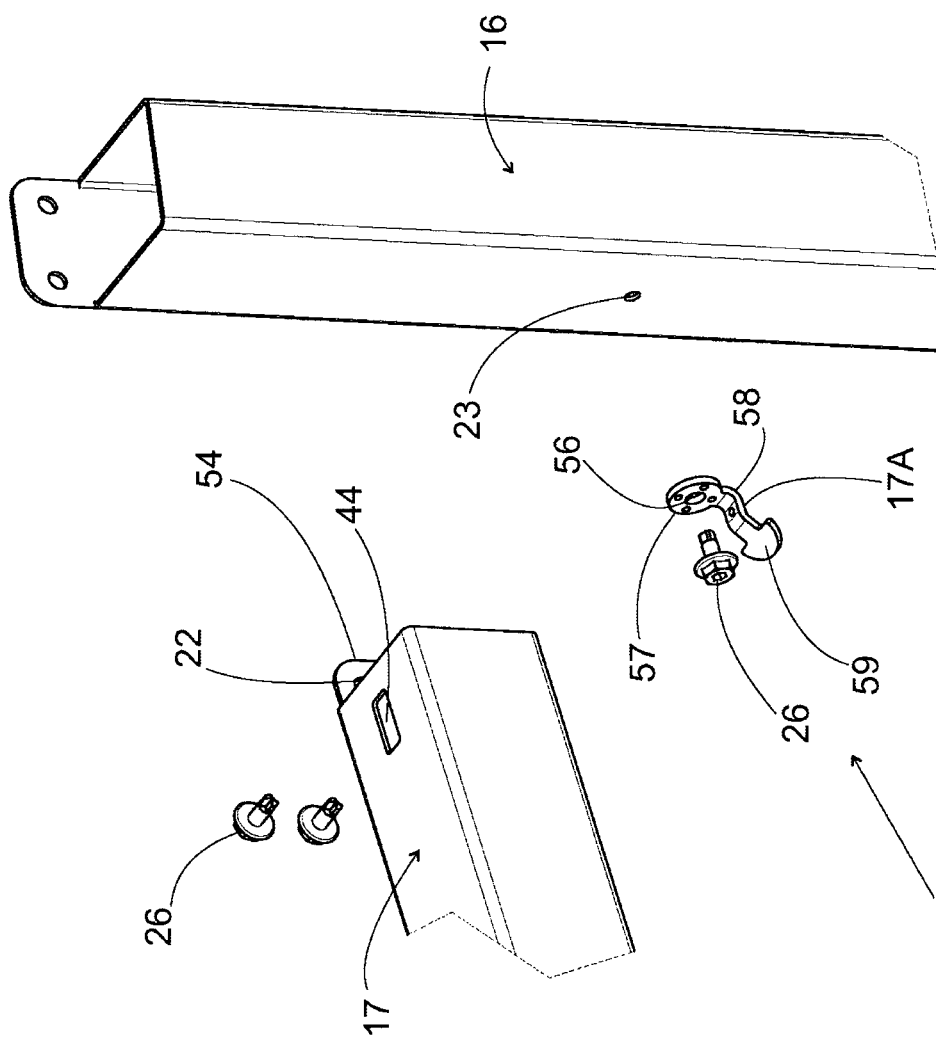

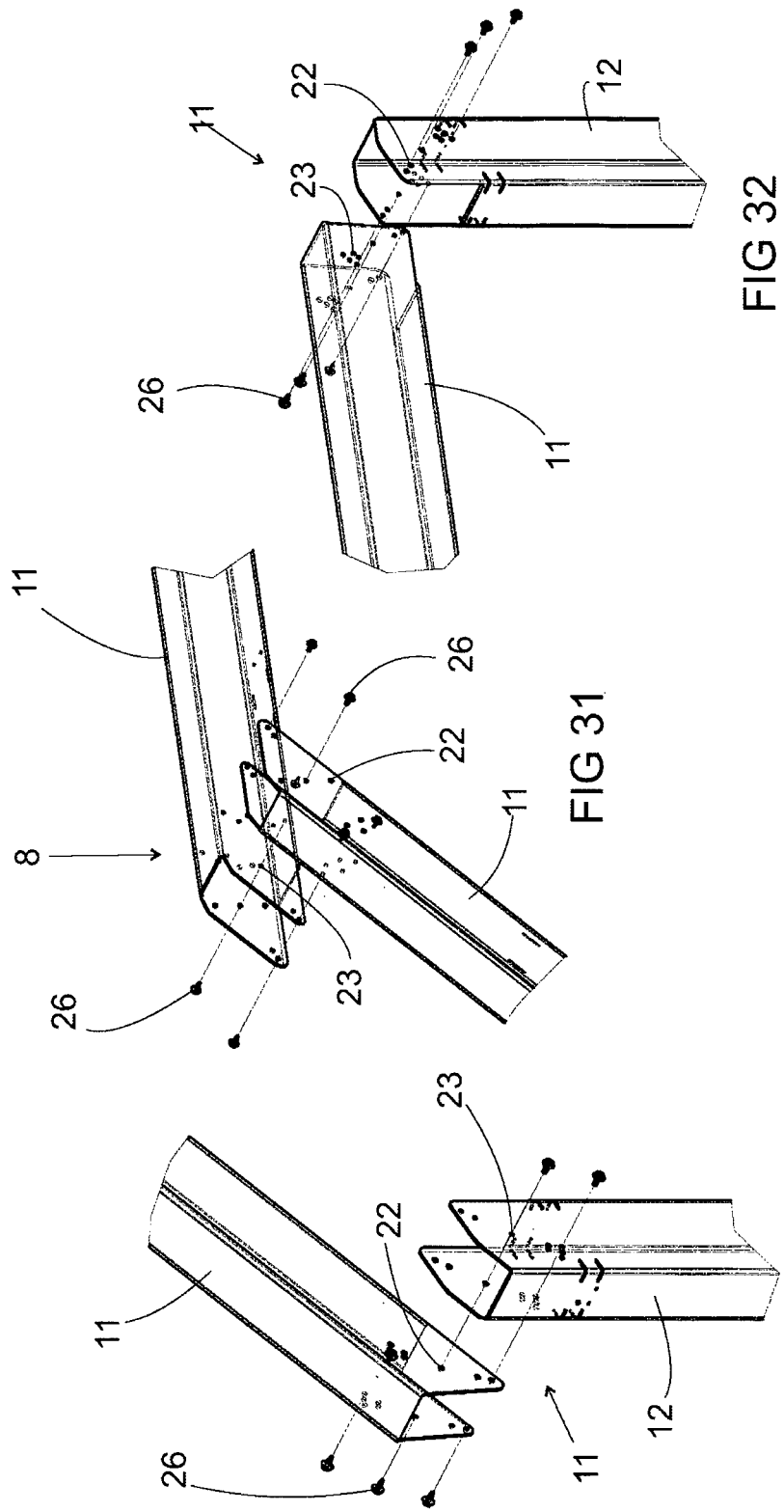

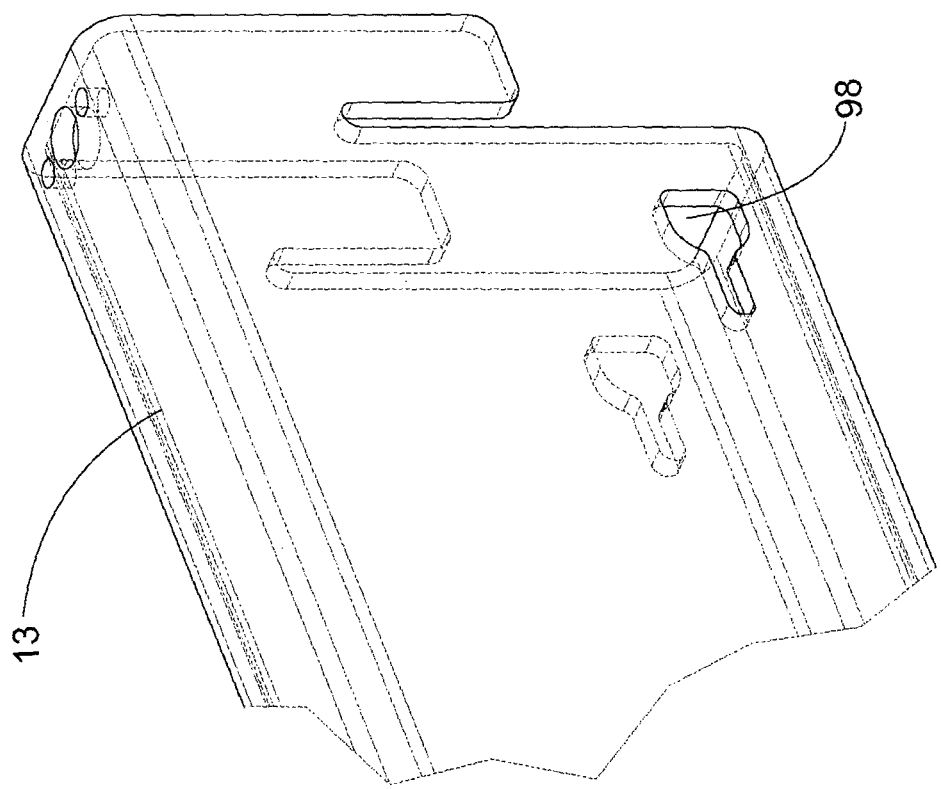

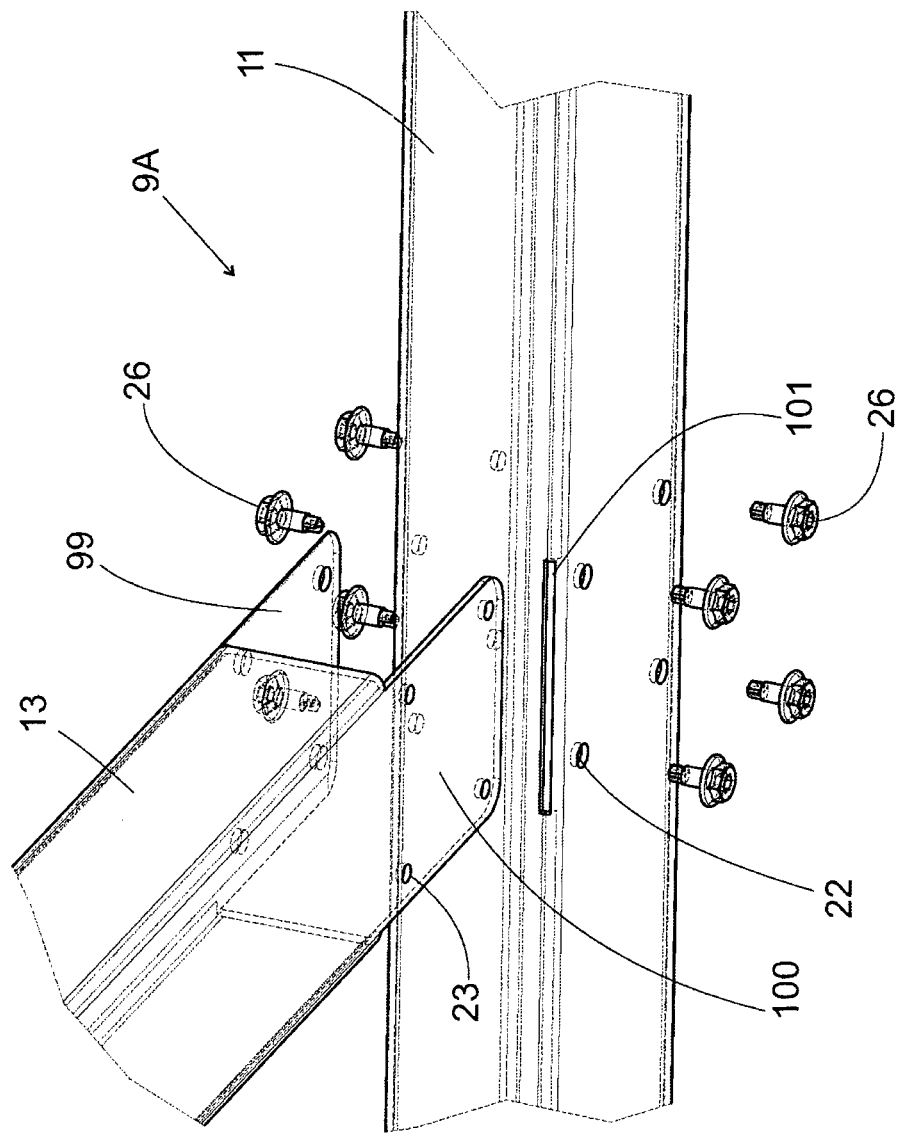

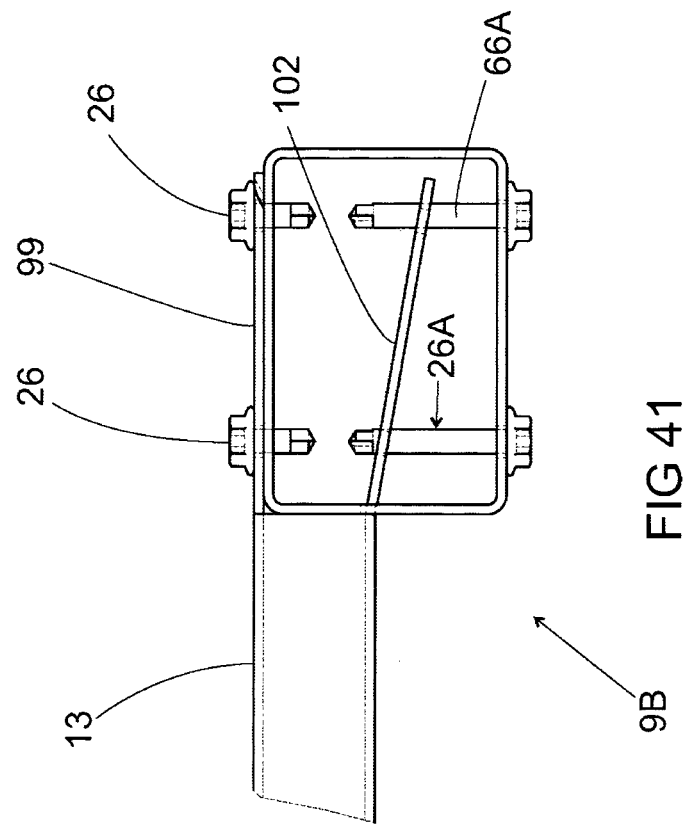
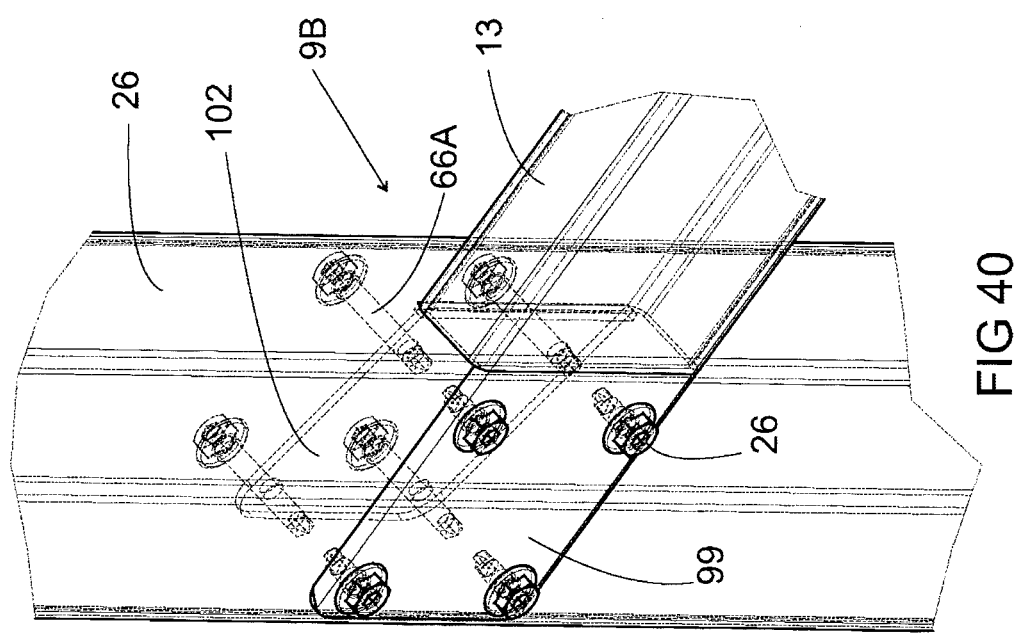
FIG 41
FIG 40

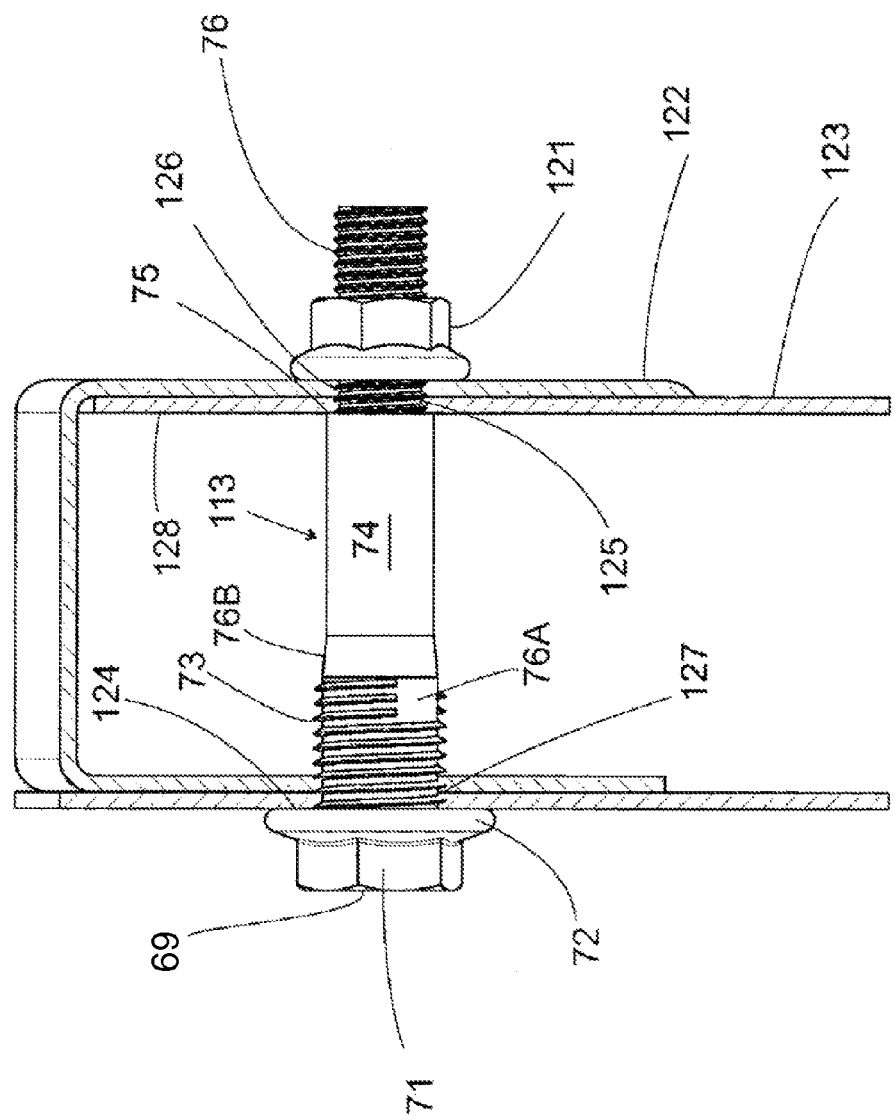

BUILDING FRAME

CROSS REFERENCE TO RELATED APPLICATION

This is a National Stage of International Application No. PCT/AU2011/000048, filed 18 Jan. 2011, which claims the benefit of Application No. 2010900225, filed in Australia on 21 Jan. 2010 and Application No. 2010903461, filed in Australia on 3 Aug. 2010, the disclosures of which Applications are incorporated by reference herein.

FIELD OF THE INVENTION

This invention relates to a building frame which includes a plurality of structural elements. The invention also includes within its scope a method of construction of the building frame.

BACKGROUND ART

Metal framing systems are commonly used in the construction of buildings using channel shaped structural members that commonly include I beams, members having a H shaped cross section and members having a C or Z shaped cross section which include purlins and girts. C and H shaped members may be used to form vertical columns and I beams and C shaped members may be used for horizontally oriented structural members.

However, it is a feature of such conventional building frames that use is made of custom designed or especially designed brackets in interconnection of adjacent structural members. Such brackets were dependent upon the various types of structural members as described above. It was to be appreciated that use of such brackets was found to be extremely costly because it increased the number of building components that were necessary in construction of the conventional building frame as well as such brackets being expensive because of the fact that they had to be designed and used for a specific application or purpose. Transportation costs were also relevant.

Examples of such conventional brackets or components include TUFTEX brackets located at www.tallantinc.com, building canopy brackets located at www.salvo.co.uk, L-shaped brackets located at www.botmag.com, building brackets located at www.abcsheetmetal.com and side mounting brackets located at www.astel.comms.com.

Reference may also be made to specially designed joints or connectors for joining adjacent structural members as described in U.S. Pat. Nos. 7,637,069, 4,105,348, 7,739,841, 4,315,386, 4,365,453, 6,757,643, 6,735,917, 7,325,362, 4,346,540 and 4,976,076.

Reference may also be made to AU 2006202073 which described a modular building frame which uses a specially designed connector component in interconnection of adjacent structural members of rectangular hollow section (RHS).

International Publication WO03/080951 describes a plurality of angle-iron components in interconnection of adjacent I beams.

AU 200059520 describes a building frame having a number of portal frames which are interconnected by roof purlins and wall girts. Each of the portal frames has a pair of vertical columns interconnected by a pair of rafters which are attached to each other by an apex connector at their mutually adjacent upper ends. There is also provided a knee connector attaching a lower end of each rafter to a top end of an adjoining vertical column. Each of the structural members forming each portal frame as well as each purlin was formed from RHS.

Reference may also be made to International Publication WO2007/091903 which describes a joint system for connection of adjacent channel shaped structural members without the use of separate brackets or connectors wherein one structural member at an end thereof is provided with a triangular tongue or projection and another structural member is provided at an end thereof with an angled end which extends from one side flange of the channel shaped member to another side flange of the channel shaped member. In use the triangular tongue is located beneath the angled end and attached thereto by fasteners. Reference in this reference is also made to interconnection of vertical channel or C shaped structural members to a horizontal structural member wherein the horizontal members extend through a cut-out or notch of the vertical member and attached to a web of the vertical member by fasteners. A similar form of interconnection is used in connection of a horizontal channel shaped member to an adjacent top or bottom end of a vertical member. Again there is no requirement for an additional connector or bracket in relation to connection of a vertical structural member to a horizontal structural member.

Reference also may be made to International Publication WO01/83906 which describes a roof truss having a bottom chord and a pair of inclined top chords each formed from channel members having a top flange, bottom flange and interconnecting web. The bottom chord has openings formed in its top flange at opposite ends and an upwardly extending web extension extending longitudinally to the bottom chord. Each of the top chords has upwardly extending ends forming an apex wherein each of the upwardly extending top ends is cut to a shape forming an outwardly extending extension or projection so that one extension underlies the other with each of the webs abutting each other. The apex angle may be varied as required by varying the angle of cut of each of the top ends of each top chord.

While International Publications WO2007/091903 and WO01/83906 proposed the connection of structural members to each other in relation to construction of building frames without the use of specially designed joints or connectors, the resultant connection in relation to formation of an apex joint formed by connection of adjacent and upwardly extending rafters or top chords was not strong and thus there was a propensity for the apex joint to buckle or twist under load. This was because the apex joint was substantially oriented in a horizontal plane in the case of WO2007/091093 or a vertical plane in the case of WO01/83906 formed by a pair of abutting planar plate-like projections in the case of WO01/83906 or a plate-like projection abutting a web of a channel member in the case of WO2007/091903.

It is therefore an object of the invention to provide a joint for use in a building frame which is considerably strengthened in comparison with the prior art and which uses the natural strength of RHS or channel shaped structural members each of which has opposed side walls, and thus may alleviate the problems of the prior art discussed above.

The invention therefore provides in one aspect a joint for connection of mutually adjacent structural members wherein each structural member has a pair of major opposed walls and minor opposed walls, and said structural members are selected from rectangular hollow structural (RHS) sections and channel shaped structural members, wherein adjacent parts of one structural member are directly attached to adjacent parts of another structural member without the use of connecting brackets whereby in formation of said joint each of the major opposed walls of said one structural member has a face located adjacent to and overlapping a face of each of the major opposed walls of said another structural member and connected thereto by a plurality of fasteners characterized in that said joint is selected from (i) each of the major opposed walls of said one structural member or each of the major opposed walls of said another structural member comprise a pair of outwardly extending tongues or projections formed by removing a portion of one or both of the minor opposed walls and conforming one or both of the major opposed walls to a desired angle of said joint; or (ii) there is provided a slot in one of the minor opposed walls interconnecting said major opposed walls of one structural member to facilitate insertion of a tongue or projection of the another structural member within said slot.

The joint as described above is very strong and thus deflection under load is substantially avoided.

Preferably in regard to the joint as described above there is provided an apex joint wherein each structural member are each upwardly extending and obliquely oriented to each other wherein each opposed wall of each structural member is formed by the outwardly extending tongues or projections referred to in case (i).

Preferably each tongue or projection is of a triangular shape and more suitably in the form of a right angled triangle.

Each of the adjacent tongues or projections are connected to each other by fasteners that extend through aligned apertures in each adjacent tongue or projection.

In a more preferred arrangement and to reinforce the apex joint discussed above there may be provided a bottom plate located between a pair of side tongues or projections in one end of one structural member and there also may be provided a retaining slot or recess located in the end of the other structural member whereby upon formation of the apex joint the bottom plate is located within said retaining slot or recess with each adjacent side tongues or projections being attached to each other by the fasteners.

Another advantage of the apex joint of the invention is that the included angle between the upper ends of each structural member may be varied between 120° and 170° and this may be achieved by providing an angled cut on each pair of opposed tongues and projections and/or by using a particular array of aligned apertures in each adjacent tongue or projection. Thus, the opposed tongues and projections may be formed by conforming one or both of the major opposed walls to a desired angle of the joint.

In another preferred embodiment, each opposed wall of the one structural member is in substantial abutment with a proximal opposed wall of said another structural member.

In another preferred embodiment, each opposed wall of said one structural member is spaced from a proximal opposed wall of said another structural member.

In an alternative to the above, each opposed wall of said one structural member is angled with respect to the proximal wall of said another structural member. In a variation, one of each opposed wall of said one structural member may be angled in relation to a proximal opposed wall of said another structural member.

The invention also includes within its scope a building frame which incorporates the joint as described above and such building frame in one embodiment may form a portal frame having a pair of upright frame members interconnected by each of the mutually adjacent structural members interconnected by the joint.

There also in this embodiment may be formed a side joint between an upright frame member and a bottom end of an upwardly extending or horizontal frame member and this may comprise one of the upright frame member or upwardly extending or horizontal frame member with one or more tabs which may be aligned with corresponding slot(s) in the other of the upright frame member or upwardly extending or horizontal frame member which then may be retained therein by suitable fasteners extending through aligned apertures in each frame member.

Alternatively one of the frame members forming the side joint may be provided with an outwardly extending tab which overlies an adjacent surface of the other frame member and is attached thereto by fastener(s).

The structural members used in the joint of the invention preferably have RHS or square cross section although channel members may be used in some cases.

The joint of the invention may also interconnect adjacent ends of structural members or in some cases may be used to interconnect one end of one structural member to a location intermediate the ends of another structural member or again in other situations may be used to interconnect said intermediate locations of adjoining structural members.

DETAILED DESCRIPTION OF THE PREFERRED EMBODIMENTS

A reference may now be made to a preferred embodiment of the invention as shown in the attached drawings wherein:

FIG. 4A is a detailed view of circular area "X" shown in FIG. 4;

FIG. 15 shows use of a joint interconnecting a bracing member to an adjacent vertical member of the building frame;

FIG. 16 shows the same joint as shown in FIG. 15 using an alternative perspective view;

FIGS. 30, 31, 32, 33, 34, 35 and 36 show the use of the connection of adjacent members to each other as shown in FIG. 29 so as to achieve varying angles in regard to the inclination of a rafter to an adjacent vertical column or of the connection of adjacent rafters to each other;

FIGS. 37 and 38 shows use of a hook washer of the invention in relation to a keyhole shaped slot;

FIG. 39 shows use of an alternative joint between a rafter and an adjacent purlin;

FIGS. 40 and 41 shows a variation of the joint shown in FIG. 39;

FIG. 50 shows the interconnection of adjacent structural members to each other using a bolt of the invention shown previously.

Figure 1:
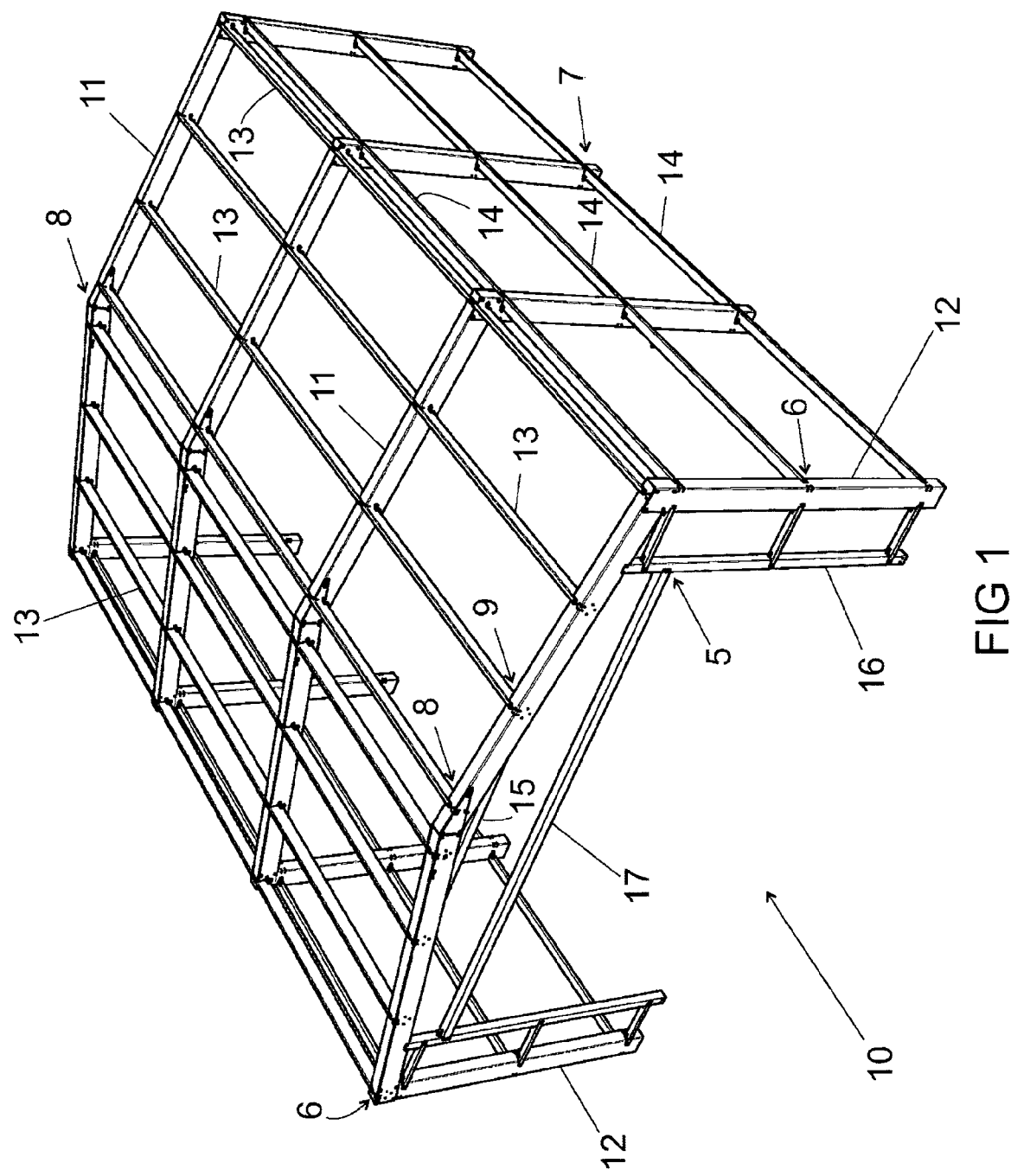
FIG. 1 is a perspective view of a building frame constructed in accordance with the invention.

In FIG. 1 there is shown a building frame 10 of the invention which includes rafters or main roof support bearers 11, main support columns 12, purlins or longitudinal roof members 13, girts or side wall cross members 14, roof brace 15, auxiliary posts 16, and front horizontal cross member 17. There is also provided joints 8 interconnecting adjacent rafters 11, joints 9 interconnecting purlins 13 and rafters 11, joints 7 interconnecting columns 12 and girts 14, joints 6 interconnecting rafters 11 and columns 12 or columns 12 and girts 14, and joints 5 interconnecting auxiliary posts 16 and horizontal cross member 17.

Figure 2:
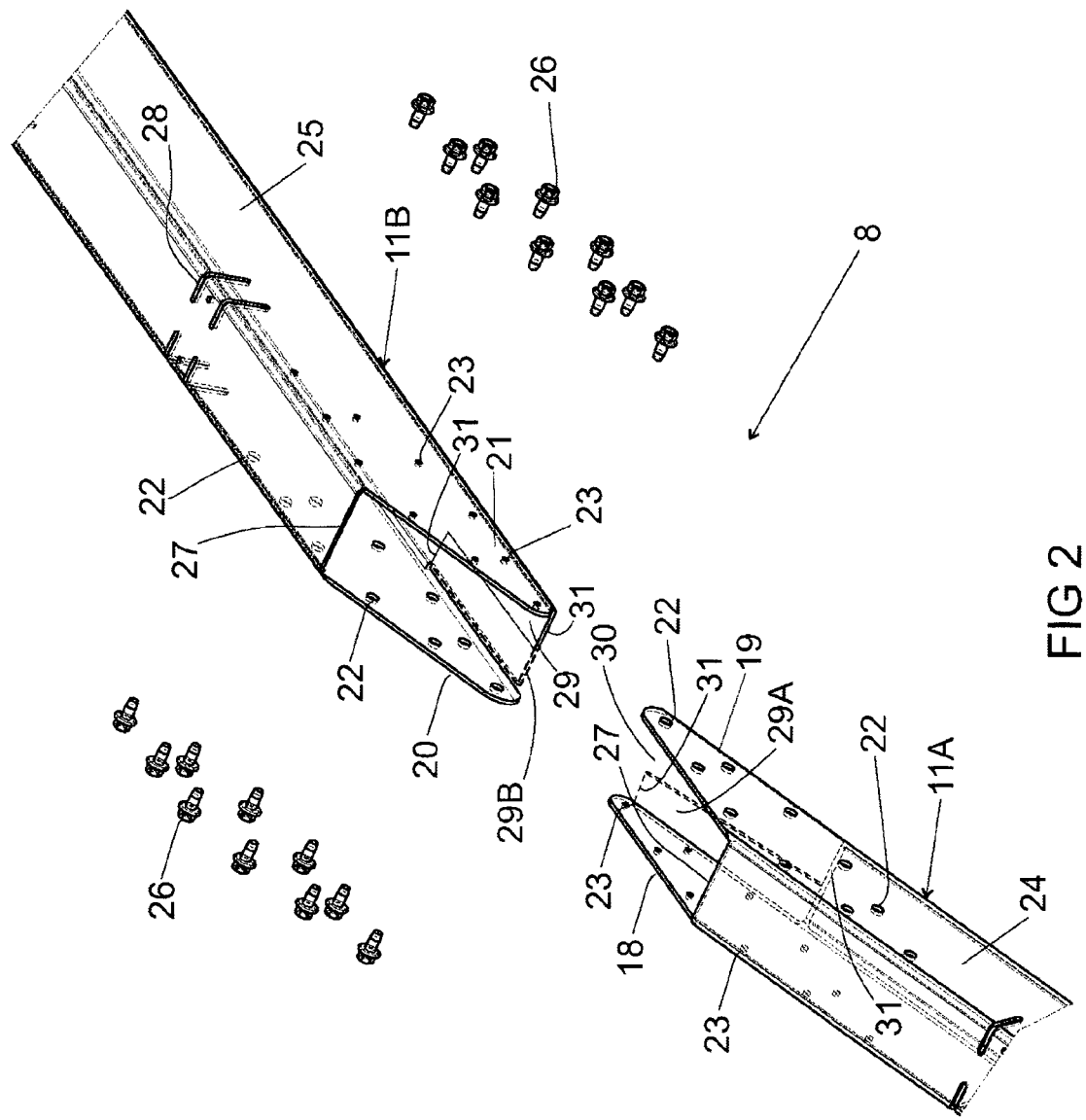
FIG. 2 is an exploded perspective view of an apex joint constructed in accordance with the invention.
Figure 3:
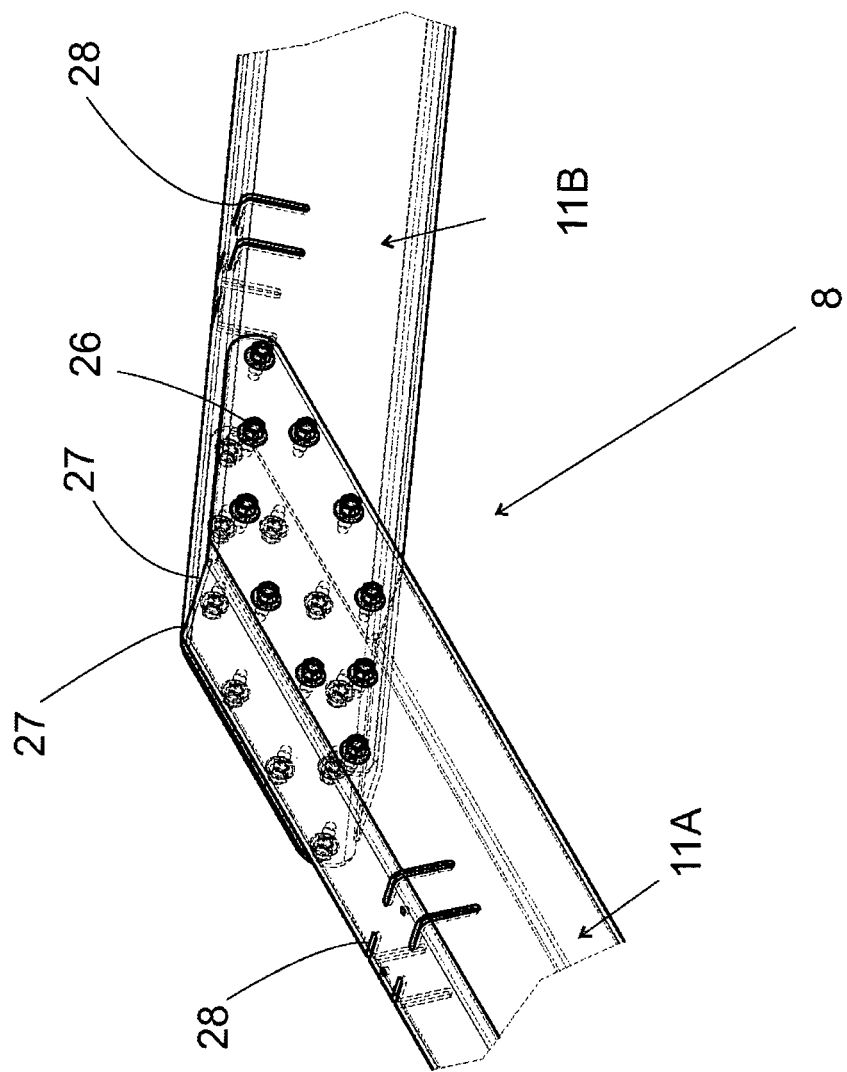
FIG. 3 is an assembled view of the apex joint shown in FIG. 2.

FIGS. 2-3 shows joint 8 in greater detail and there is shown adjacent rafters 11A and 11B which each have outwardly extending tongues or projections 18 and 19 and 20 and 21 respectively. Tongue 18 is located inwardly of adjacent tongue 20 and tongue 19 located outwardly of adjacent tongue 21. In this configuration, the adjacent tongues or projections 18, 19, 20, and 21 of adjacent rafters 11A and 11B overlap and offset each other. However it is also possible that each tongue 18 and 19 may each be located outwardly of an adjacent tongue 20 and 21 or vice versa.

In FIGS. 2-3 there is also provided aligned apertures 22 and 23 on each tongue 18 and 19 respectively. Aligned apertures 22 and 23 are also shown on each tongue 20 and 21 respectively. Aligned apertures 22 and 23 are also in opposed side walls 24 of rafter 11A and also in opposed side walls 25 of rafter 11B. Opposed side walls 24 and 25 may be considered major opposed side walls. The pair of opposed side walls between the major opposed side walls may be considered minor opposed side walls. Each of aligned apertures 22 and 23 can be connected by a self drilling structural bolt 26 which is described in greater detail in FIG. 17. FIG. 2 also shows top edges 27 of each rafter 11A and 11B which abut each other when rafters 11A and 11B are assembled as shown in FIG. 3. Joining parts of adjacent rafters 11A and 11B include portions of the opposed side walls 24 and 25 and of the tongues or projections 18, 19, 20, and 21 that contain aligned apertures 22 and 23. Thus, in some cases the joining part is the tongue or projection and in other cases the joining part is the opposed side wall against which the tongue or projection is joined with suitable fasteners. There is also shown slots 28 in FIGS. 2-3 which have a purpose as described hereinafter. There is also provided a bottom tongue or projection 29 which is received in slot 30 so that abutting bottom edges 31 may also abut as shown in FIG. 3. At the same time flange 29A may engage in corresponding slot 29B so that edges 31 may also abut in a similar manner to edges 31 of slot 30 and flange 29. However it will also be appreciated that flanges 29 and 29A may be omitted but joint 8 would not have as much strength or resistance to load.

Figure 4:
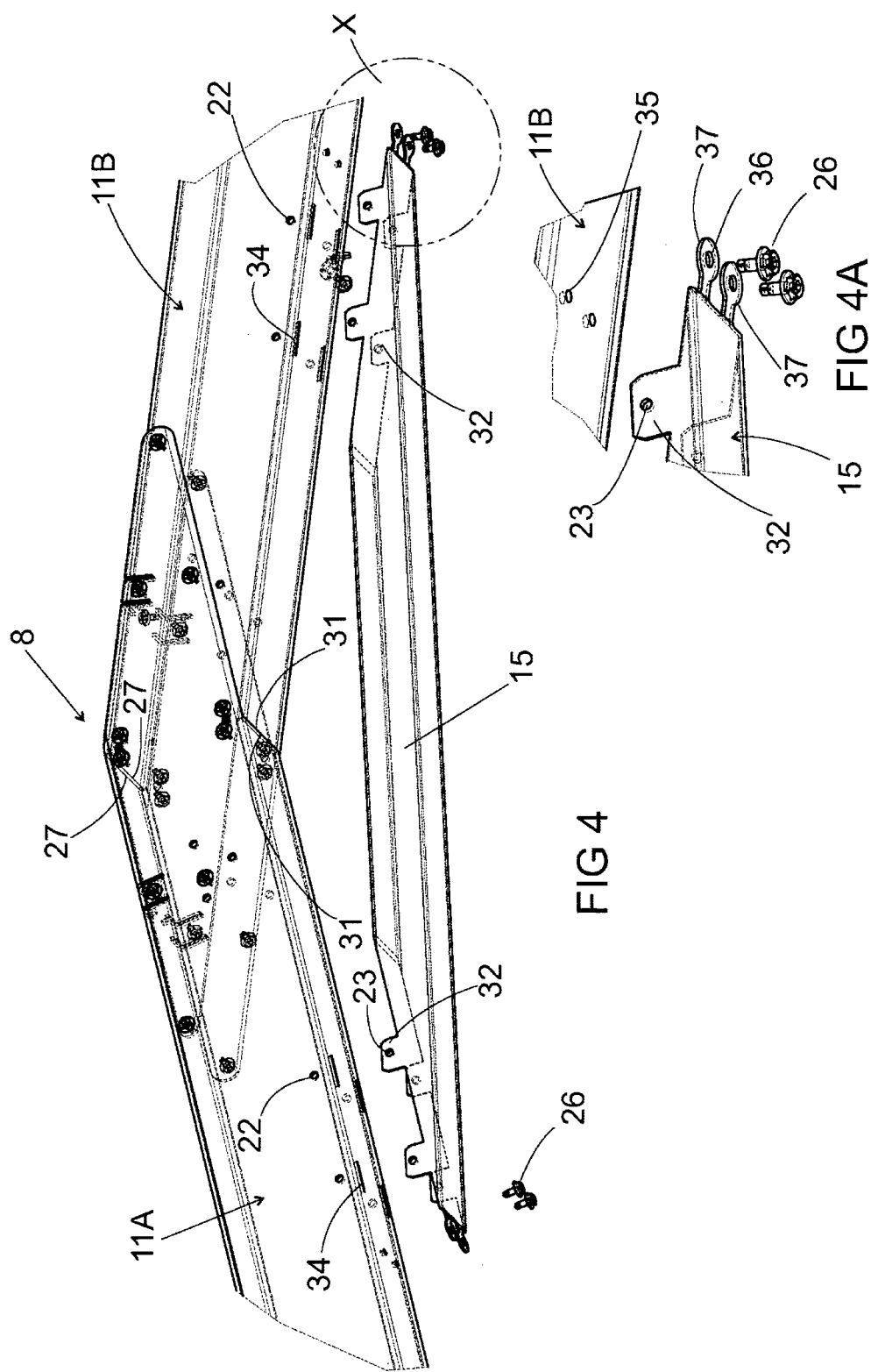
FIG. 4 is a further modification to the apex joint shown in FIG. 3 illustrating use of an additional bracing member.

In FIG. 4 which shows an underneath view of joint 8 there is shown roof brace 15 and abutting lower edges 31 of each rafter 11A and 11B. There is also shown lugs 32 which engage in mating slots 34 and thus attach roof brace 15 to the underside of each rafter 11A and 11B. It will also be appreciated that abutting edges 27 and 31 add rigidity and strength to joint 8. Fasteners 26 attach roof brace 15 to rafters 11A and 1B through aligned apertures 35 and 36 shown in FIG. 4A. Apertures 36 are located in lugs 37. Alternative or additional fasteners 26 are also located through aligned apertures 22 and 23.

Figure 5:
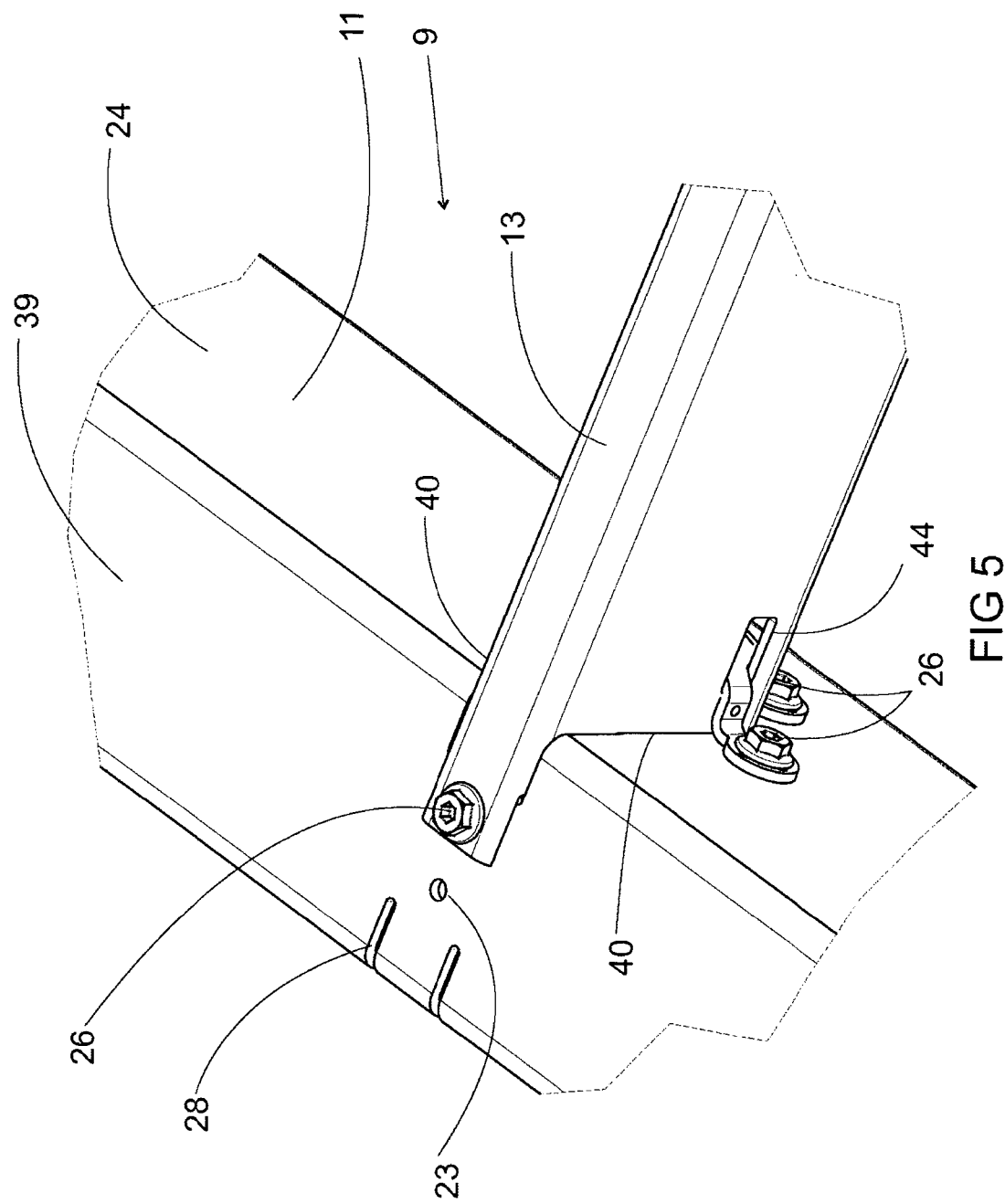
FIG. 5 is an assembled view of a joint showing connection of a rafter to an adjacent purlin.
Figure 6:
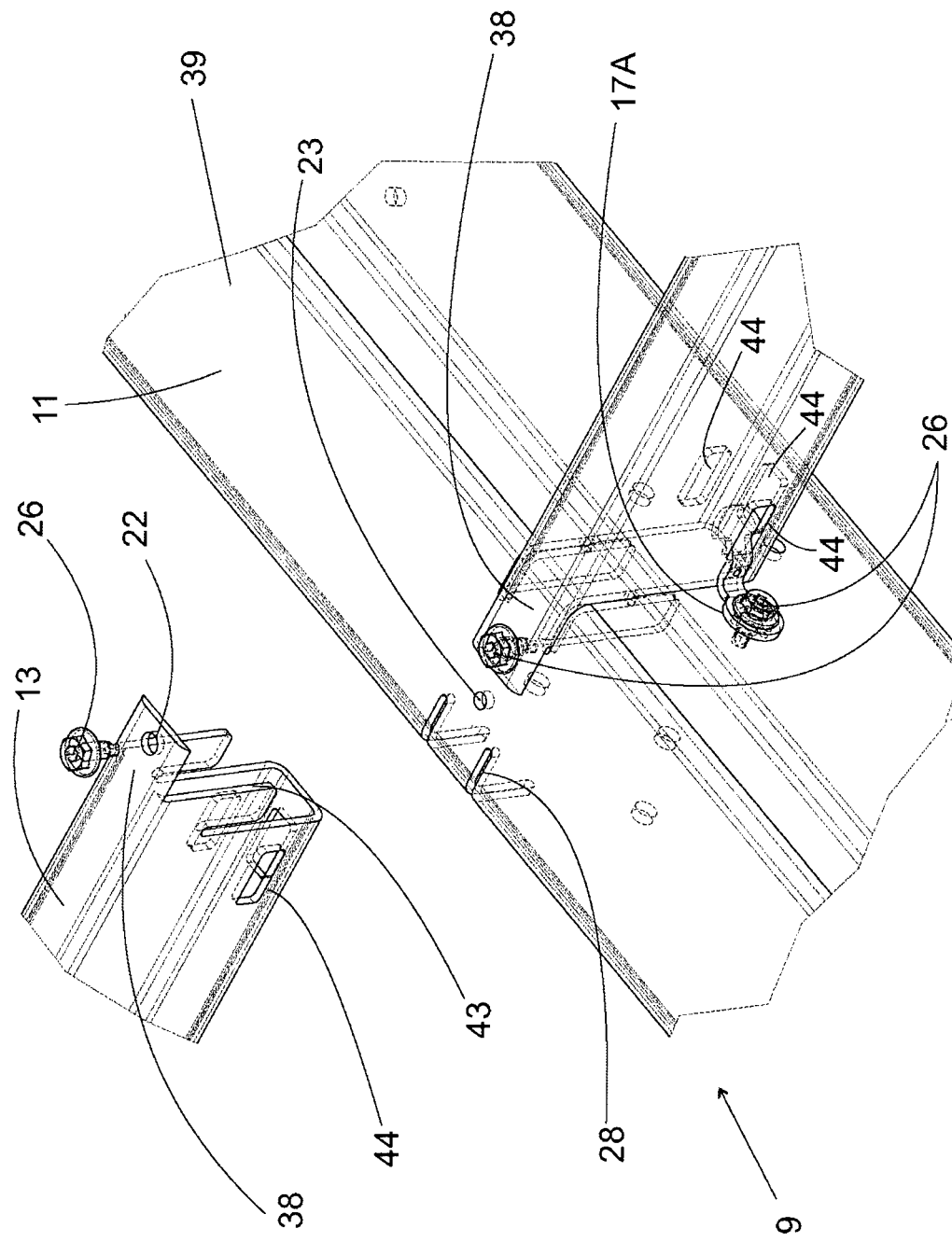
FIG. 6 is an exploded perspective view of the joint shown in FIG. 5.
Figure 7:
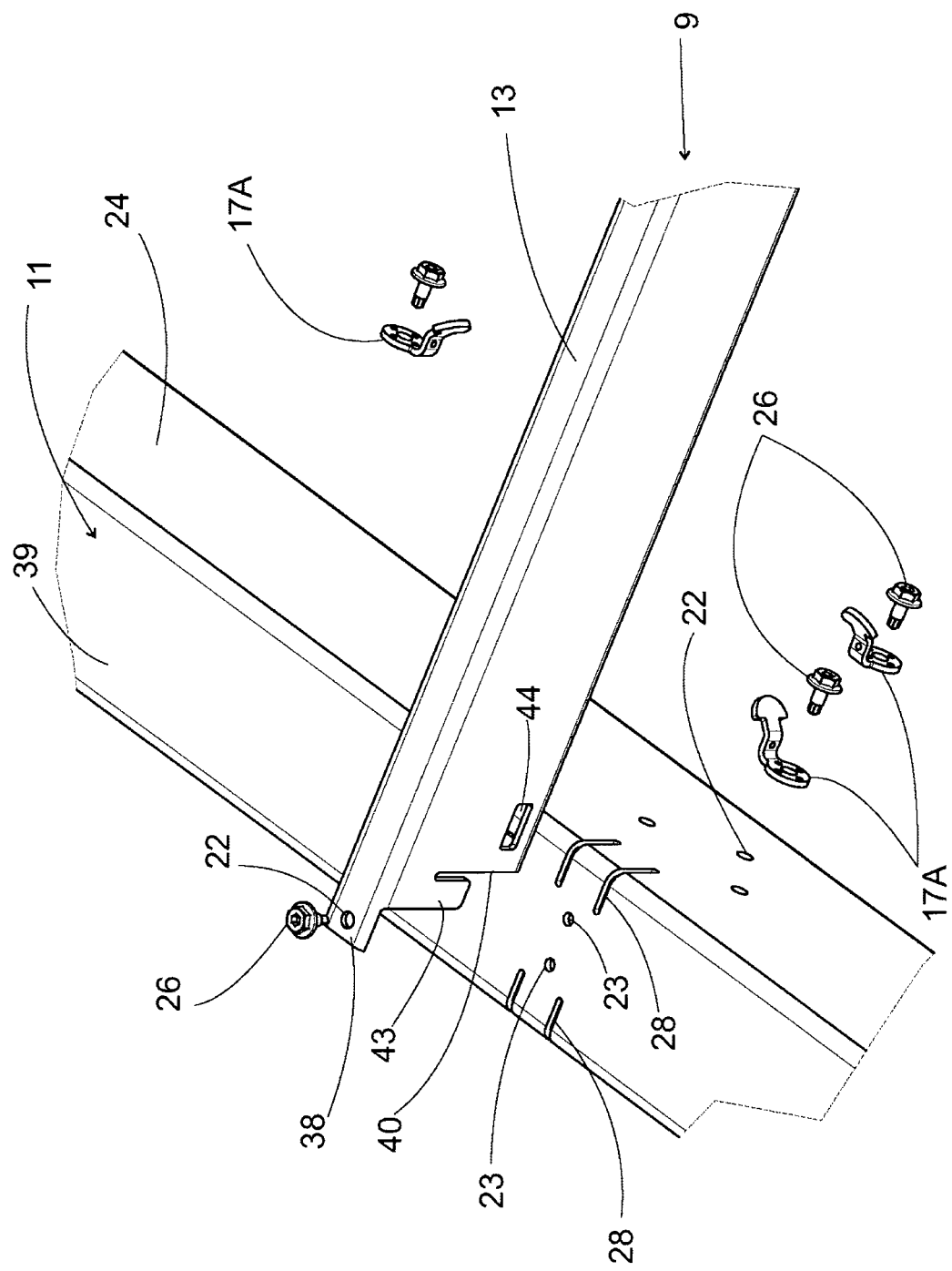
FIG. 7 is also an exploded perspective view of the joint shown in FIG. 5 and illustrating use of a structural hook washer in connection of the purlin to the rafter.

In FIGS. 5, 6 and 7 there is shown joint 9 in greater detail in connection of rafters 13 to purlins 11 wherein purlins 13 are provided with an outwardly extending projection 38 which abuts top wall 39 of rafters 11. Each of side edges 40 of rafter 13 abut side wall 24 of rafter 11 as shown. Fastener 26 extends through aligned apertures 22 and 23. There is also provided opposed tabs 43 which engage in mating slots 28 as shown in FIG. 6. There is also shown hook washer 17A better illustrated in FIG. 19 which interconnects slot 44 and aperture 22 using fasteners 26 as shown in FIG. 7 on each side of rafter 13. There is also shown a further hook washer 17A and fastener 26 which engages with the underside of rafter 13 using bottom slot 44 shown in FIG. 6.

Figure 8:
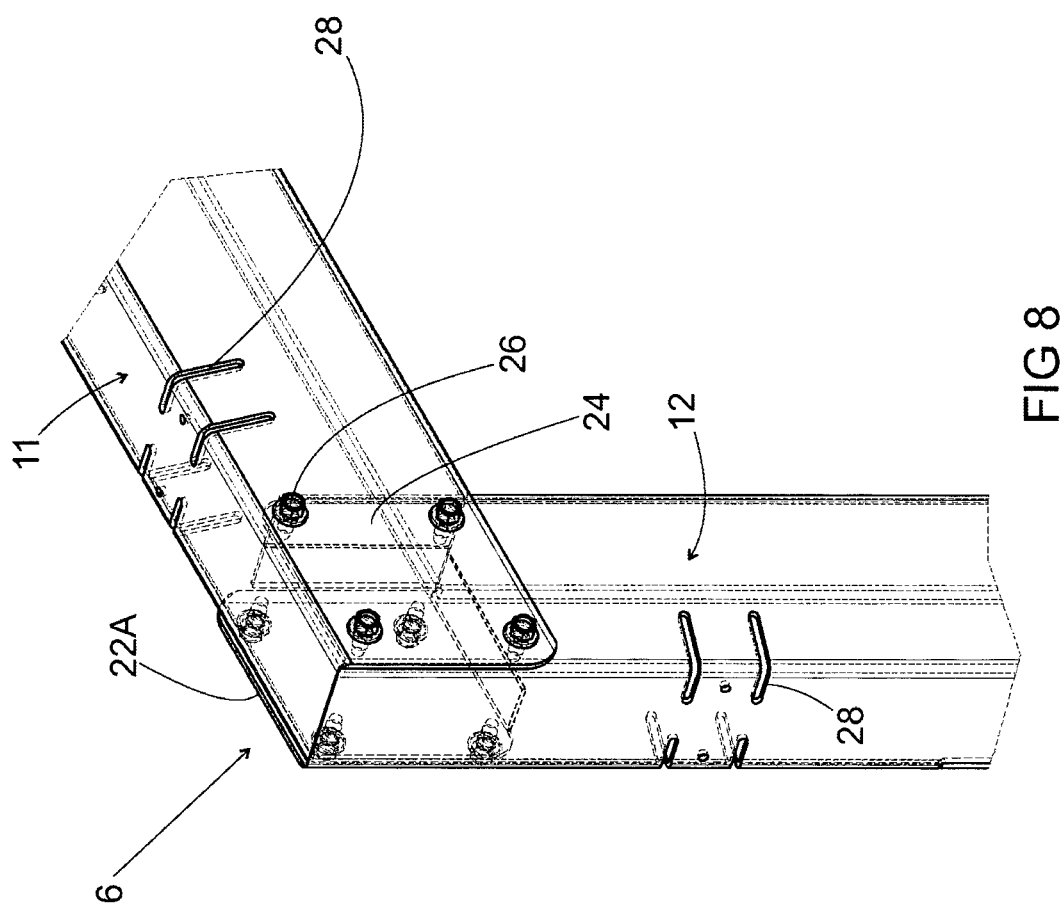
FIG. 8 shows one form of joint for interconnection of a rafter to an adjacent vertical column.

In FIG. 8 there is shown an alternative joint 4 of the invention for connection of rafter 11 to column 12. Fasteners 26 extend through aligned apertures 22 and 23. There is also shown slots 28 which can be used to receive a purlin 13 as shown in FIG. 7.

Figure 9:
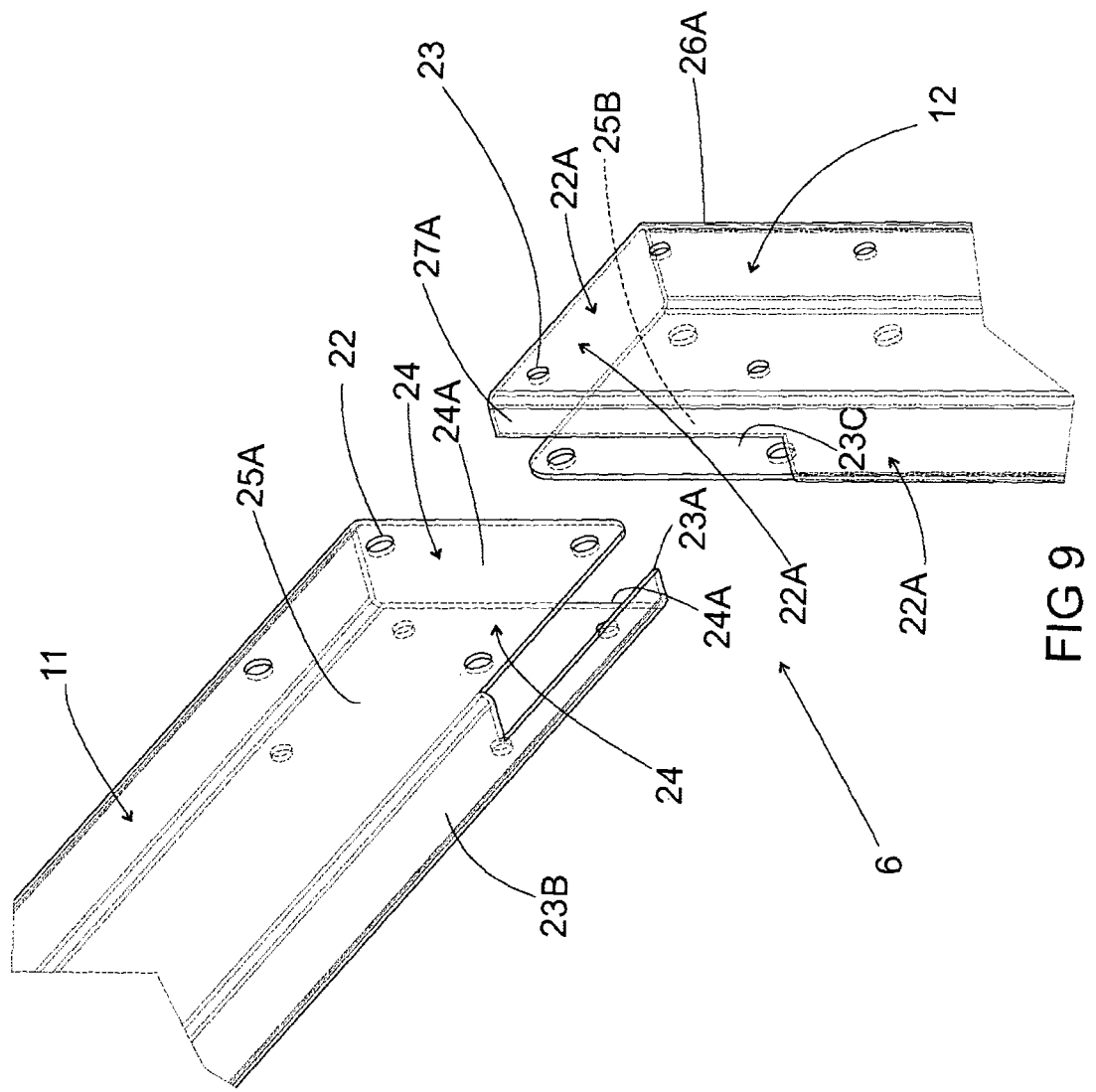
FIG. 9 is an exploded perspective view of the joint shown in FIG. 8.

In FIG. 9 there is shown joint 4 in greater detail for use in the invention in interconnection of a horizontal member such as rafter 11 to a vertical member such as column 12 wherein rafter 11 is provided with opposed vertical side walls 24 having inner surfaces 24A and column 12 is provided with opposed vertical side walls 22A. Horizontal flange 23A located in bottom wall 23B of rafter 11 extends through vertical slot 23C located in wall 22B of column 12. Outer surface 25A of rafter 11 abuts inner surface 25B of column 12 and inner surface 24A of rafter 11 abuts outer surface 26A of wall 22A. It will be appreciated from joint 4 shown in FIG. 9 that flange 23A may be omitted and flange 27A may also be omitted if desired although this may lead to a loss of strength in joint 4.

Figure 10:
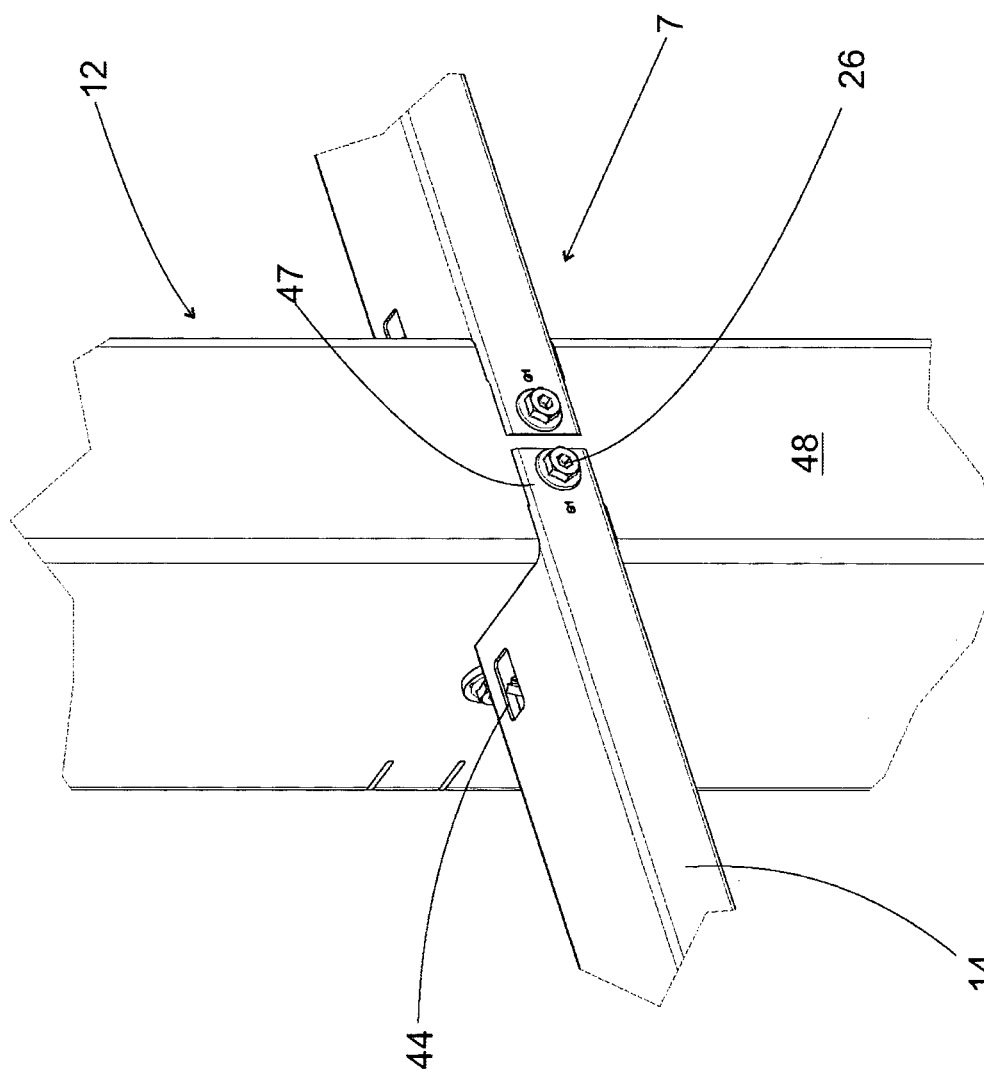
FIG. 10 is a perspective view showing connection of a vertical column to an adjacent girt with use of a particular joint.
Figure 11:
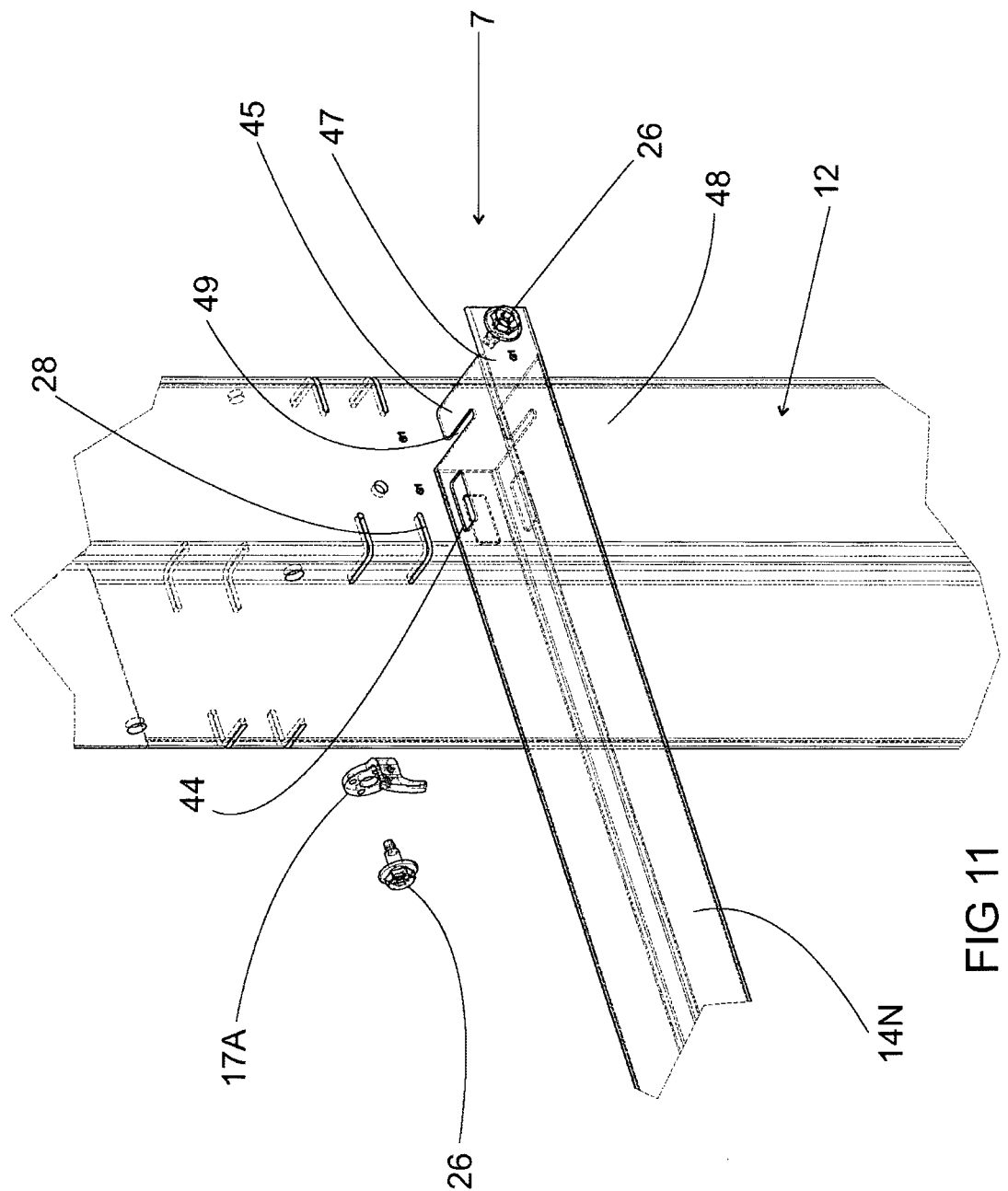
FIG. 11 is an exploded perspective view of the joint shown in FIG. 10.

FIGS. 10-11 shows a detailed view of joint 7 referring to the interconnection of girts 14 and columns 12 wherein a pair of proposed projections 45 of girt 14 engage in corresponding slots 28 in column 12. Also fastener 26 extends through aligned apertures 22 and 23. Also hook washer 17 A extends through slot 44 in a similar manner as described above in FIG. 7. There is also provided lug 47 which abuts an adjacent surface 48 of column 12 and slot 49 which facilitates engagement of lug 45 with slot 28.

Figure 12:
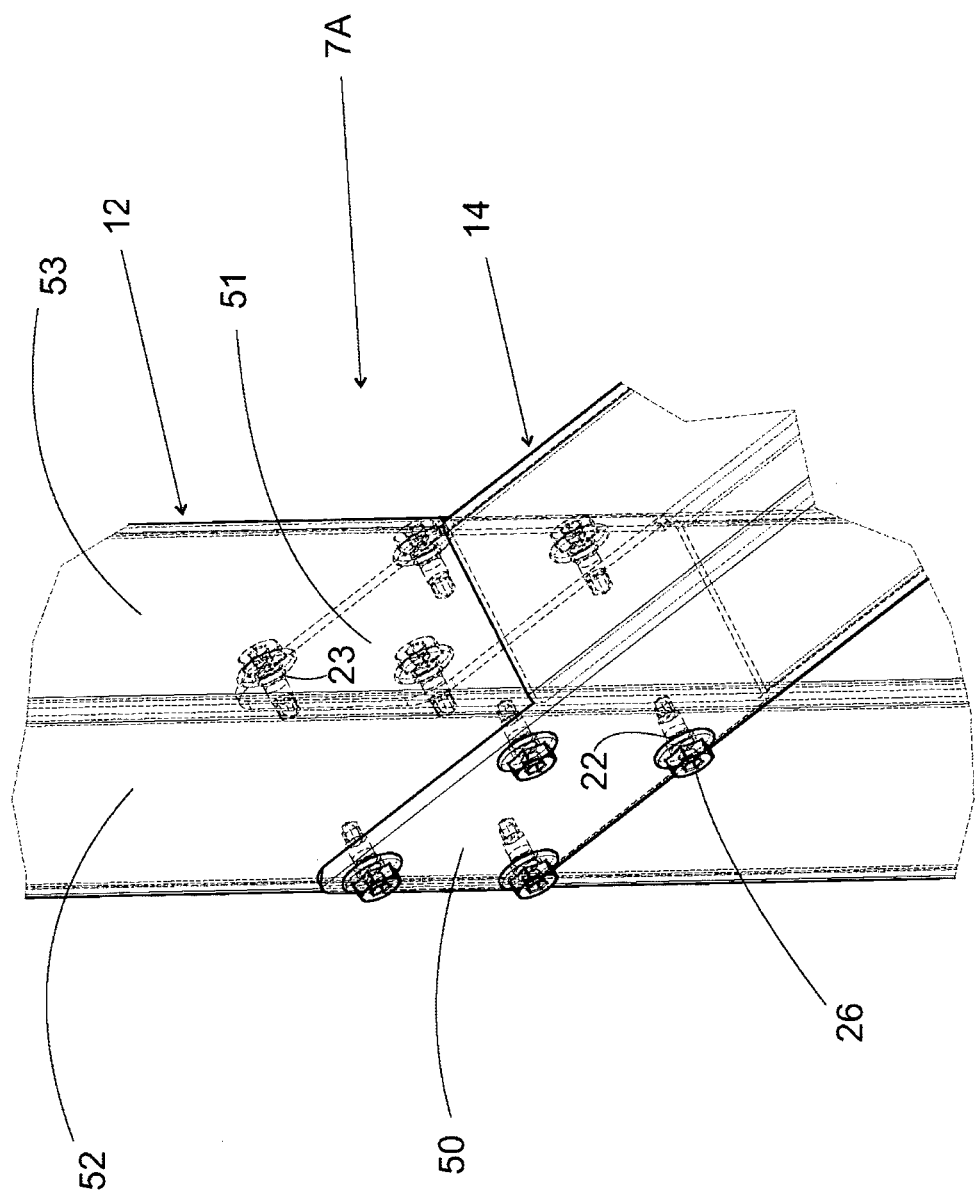
FIG. 12 shows use of an alternative joint in connection of a girt to an adjacent vertical column.
Figure 13:
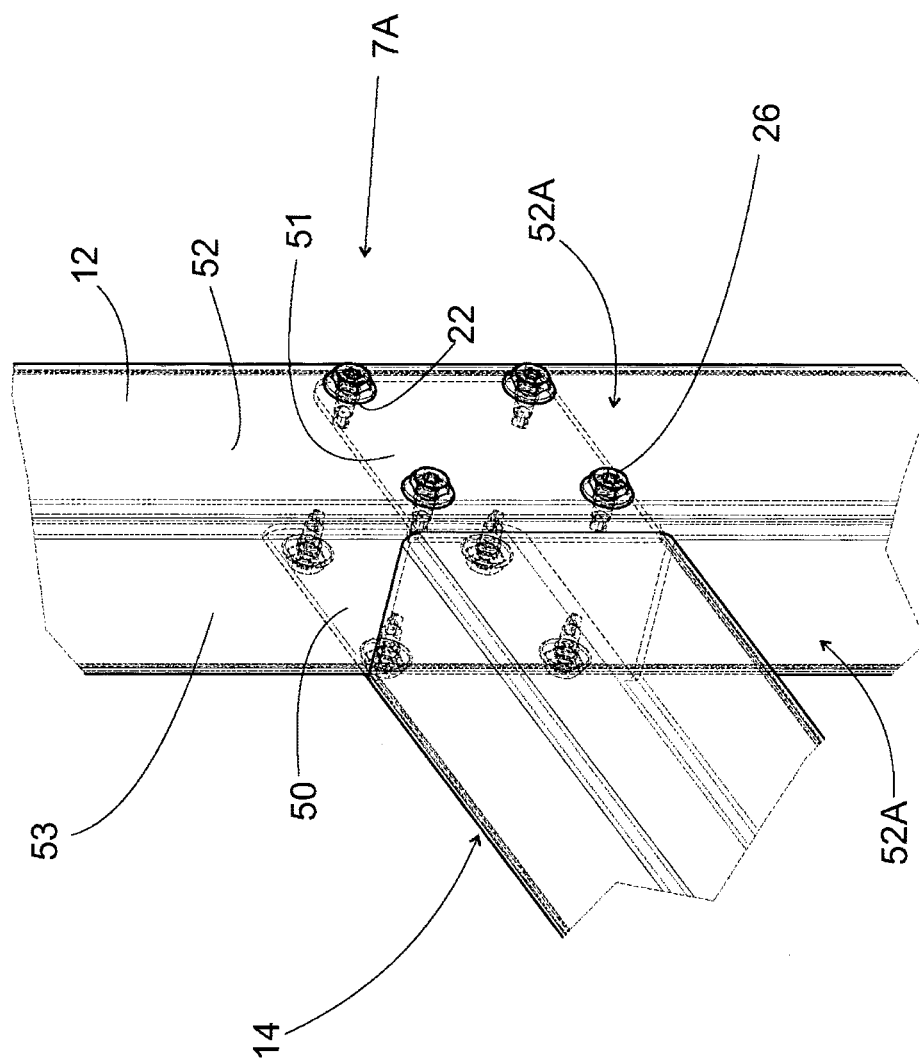
FIG. 13 shows the joint of FIG. 12 from using another side perspective view.

In FIGS. 12-13 there is shown joint 7A interconnecting of a structural member such as rafter 11 and girts 14 and column 12 wherein girt 14 has a pair of opposed side wall flanges 50 and 51 which engage an adjacent outer surface 52 of each side wall 52A of column 12 and adjacent inner surface 53 each side wall 52A of column 12 as shown and attached thereto by fasteners 26 extending through opposed or aligned apertures 22 and 23. Rafter 11 or girt 14 is inclined at an angle as shown to column 12.

Figure 14:
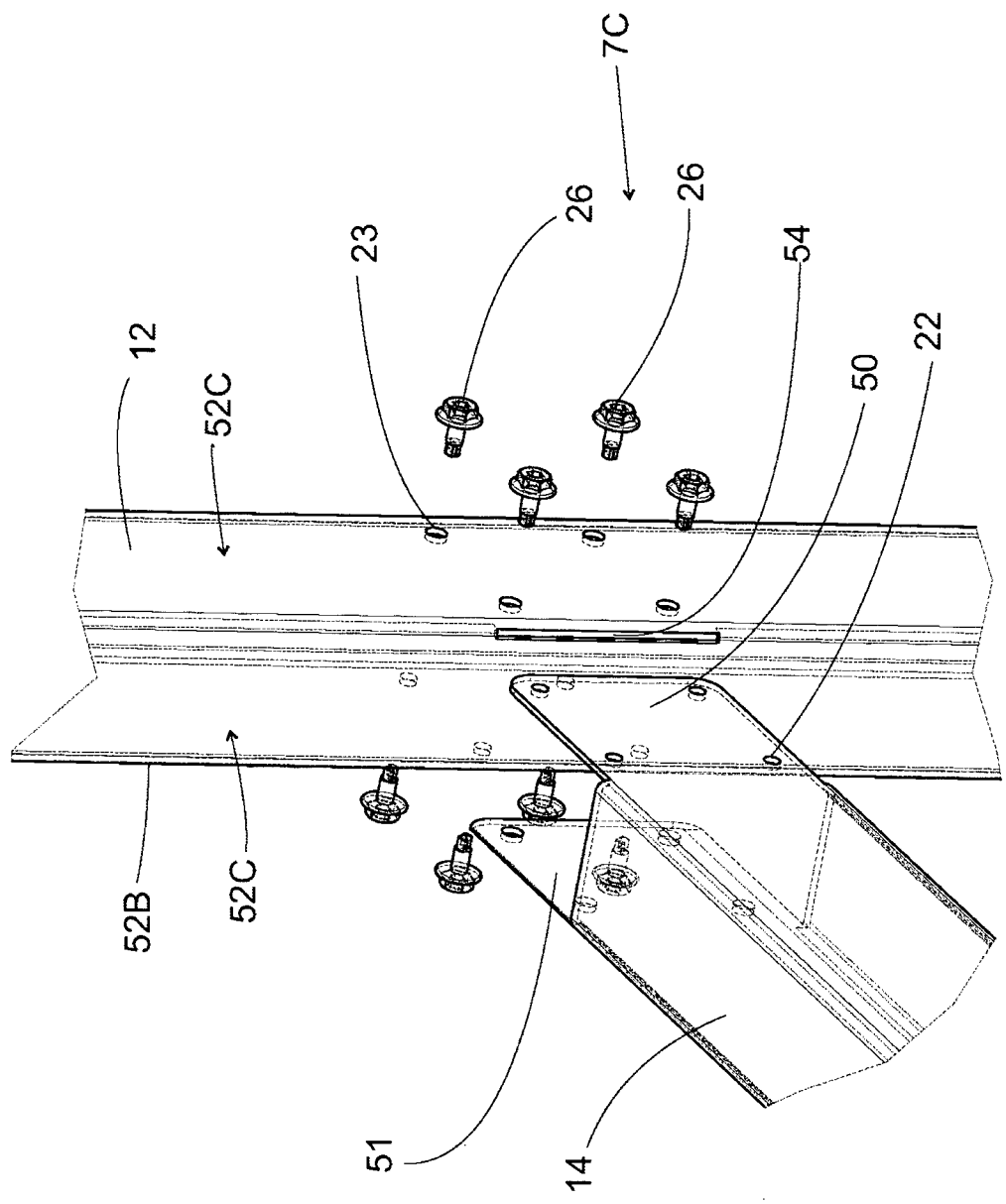
FIG. 14 shows use of an alternative joint to that shown in FIG. 12 or 13 in relation to interconnection of a girt to an adjacent vertical column.

A variation of joint 7A (i.e. joint 7C is shown in FIGS. 12-13 is shown in FIG. 14 wherein side flanges 50 engages in an aligned slot 54 and side flange 51 abuts an outer surface 52B of opposed walls 52C of column 12. Aligned apertures 22 and 23 are also provided through which fasteners 26 extend as shown in FIG. 12.

FIGS. 15-16 show joint 5 interconnecting horizontal cross member 17 and vertical member 16 wherein cross member 17 has an outwardly extending side flange 54 having apertures 22 which are aligned with apertures 23 of vertical member 16 and connected thereto by fasteners 26. There is also provided hook washer 17A which is engaged with slot 44 as shown in FIG. 7 and wherein fastener 26 attaches hook washer 17A to aperture 55A. In this regard hook washer 17A has aperture 56 in head 57 which is engaged by fastener 26. Hook washer 17A also has curved shank 58 and end locating projection 59 which extends through adjacent slot 44.

Figure 17B:
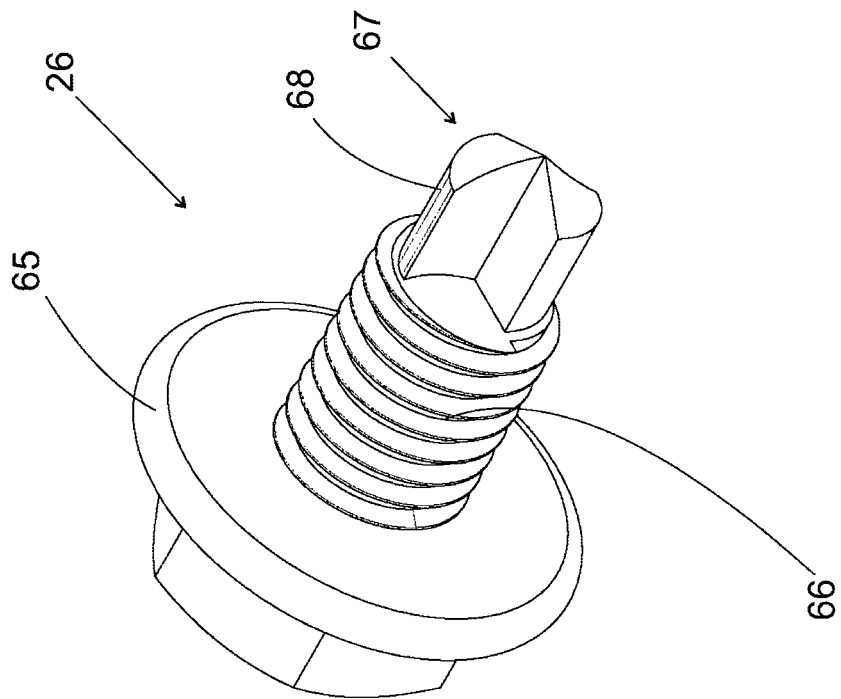
FIG. 17A and FIG. 17B illustrate a fastener that can be used in the present invention interconnecting adjoining structural members to each other.
Figure 17A:
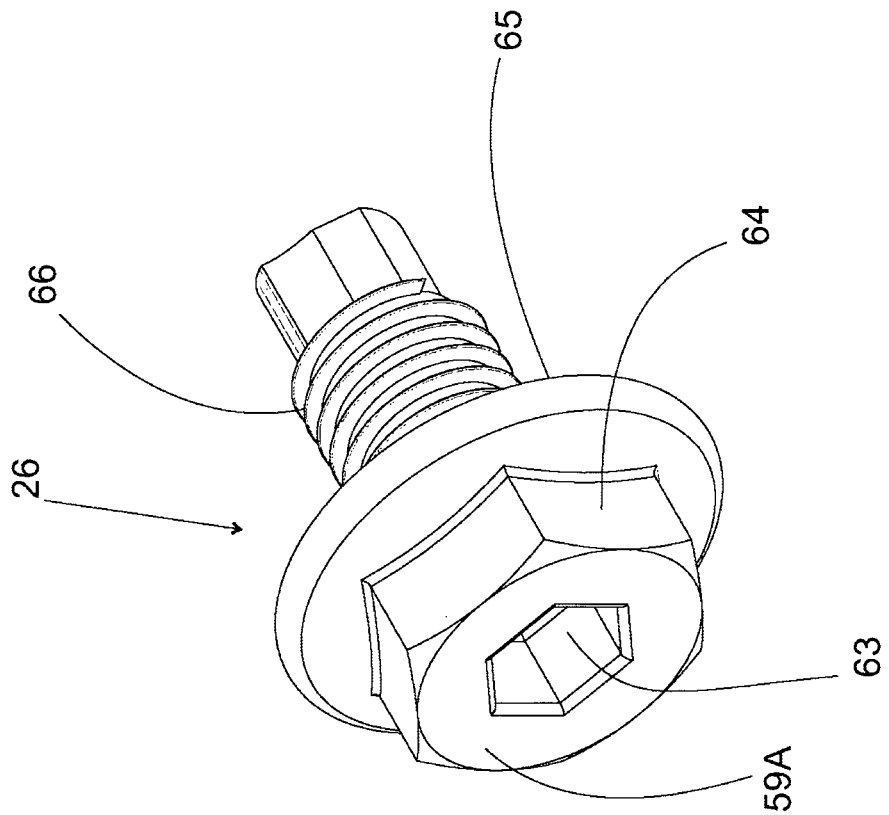

FIGS. 17A & 17B illustrate a self drilling structural bolt 26 having head 59 with an Allen key recess 63, nut portion 64, flange 65, cutting thread 66 and a specially constructed drilling head 67 having individual drilling members 68. Structural bolt 26 as shown as a unitary structural element which when attaching a pair of structural members has the facility of drawing each structural member together.

Figure 18:
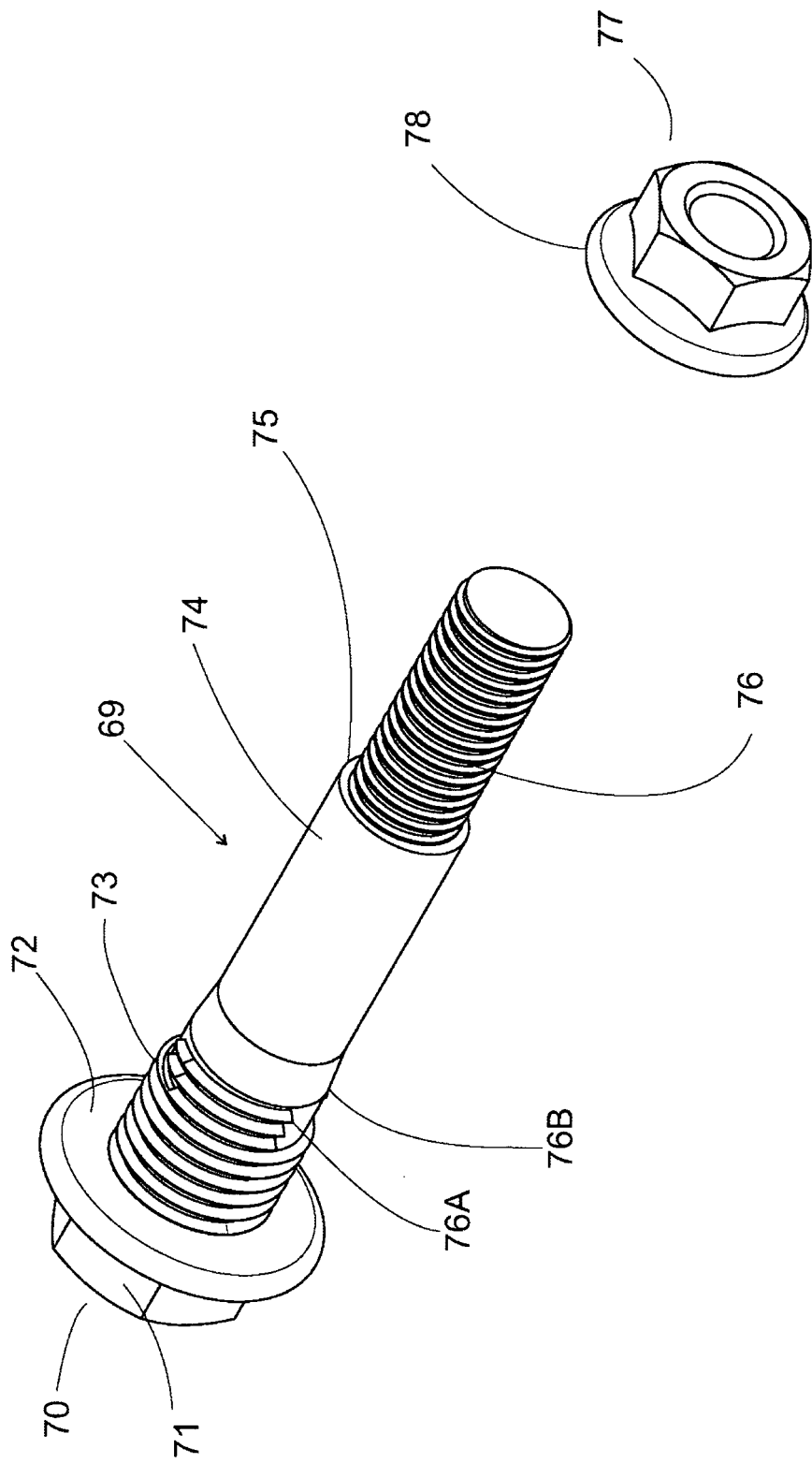
FIG. 18 shows use of an alternative fastener to that shown in FIGS. 17A and 17B.

FIG. 18 refers to a self drilling structural spacer bolt 69 having a head 71 which may be fitted with an Allan key recess (not shown) flange 72, cutting thread 73, an elongate shoulder 74, end surface 75 and end threaded portion 76. There is also provided swarf clearance groove 76A. Reference is also made to corresponding threaded nut 77 having flange 78. Bolt 69 is shown as a unitary structural element and like bolt 26 has the ability when attaching a pair of structural members together to draw each structural member together. Spacer bolt 69 also has the ability to contain one side of a pair of conjoined structural members by the use of cutting thread 73 to contain the structural elements together wherein end surface 75 is located adjacent an internal surface of one of the structural elements and the cutting thread extends through the other of the structural elements with the thread end 76 extending through an external surface of the other structural element for the purpose of attachment of an additional structural element or bracket such as a garage door for example.

Figure 19:
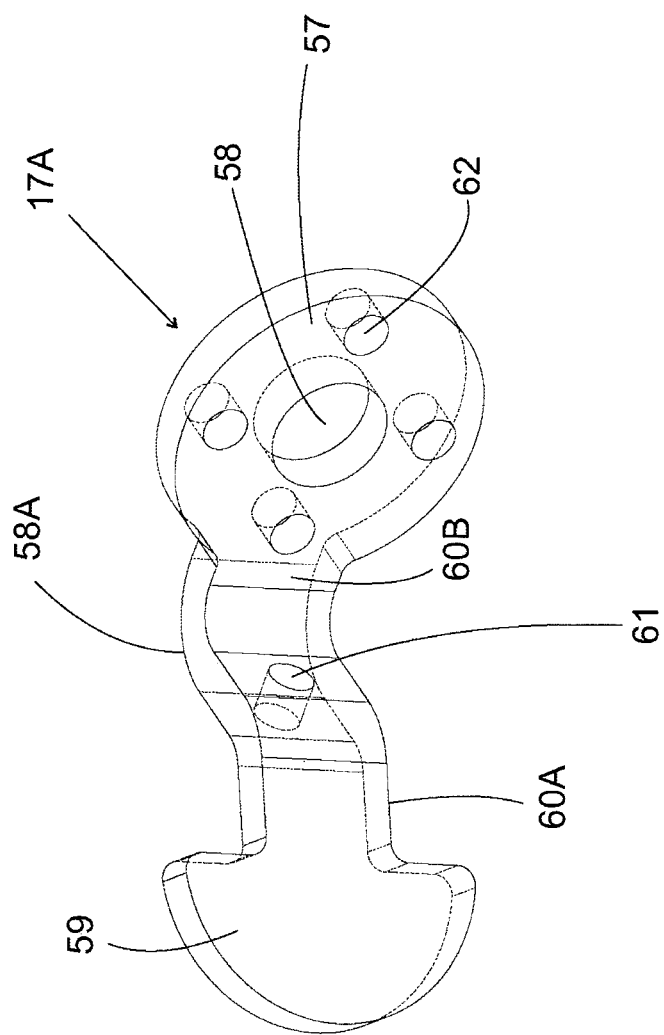
FIG. 19 shows use of an alternative fastener to that shown in FIG. 17 or FIG. 18.

FIG. 19 illustrates the hook washer 17A referred to previously which has a round end part 57 having aperture 58, curved shank 58A and having an enlarged end or head 59 having a pair of edges 59A merging into the shank 58A. In this embodiment the curved shank 58A has two parts 60A and 60B. Hook end 59 extends normal to round end part 57 and shank part 60A is at 45° to shank part 60B and shank part 60A is in the same plane as hook end 59. There is also shown attachment apertures 61 and 62 to accommodate additional self-drilling screws such as TEK screws if required in extreme or cyclonic load conditions.

Figure 20:
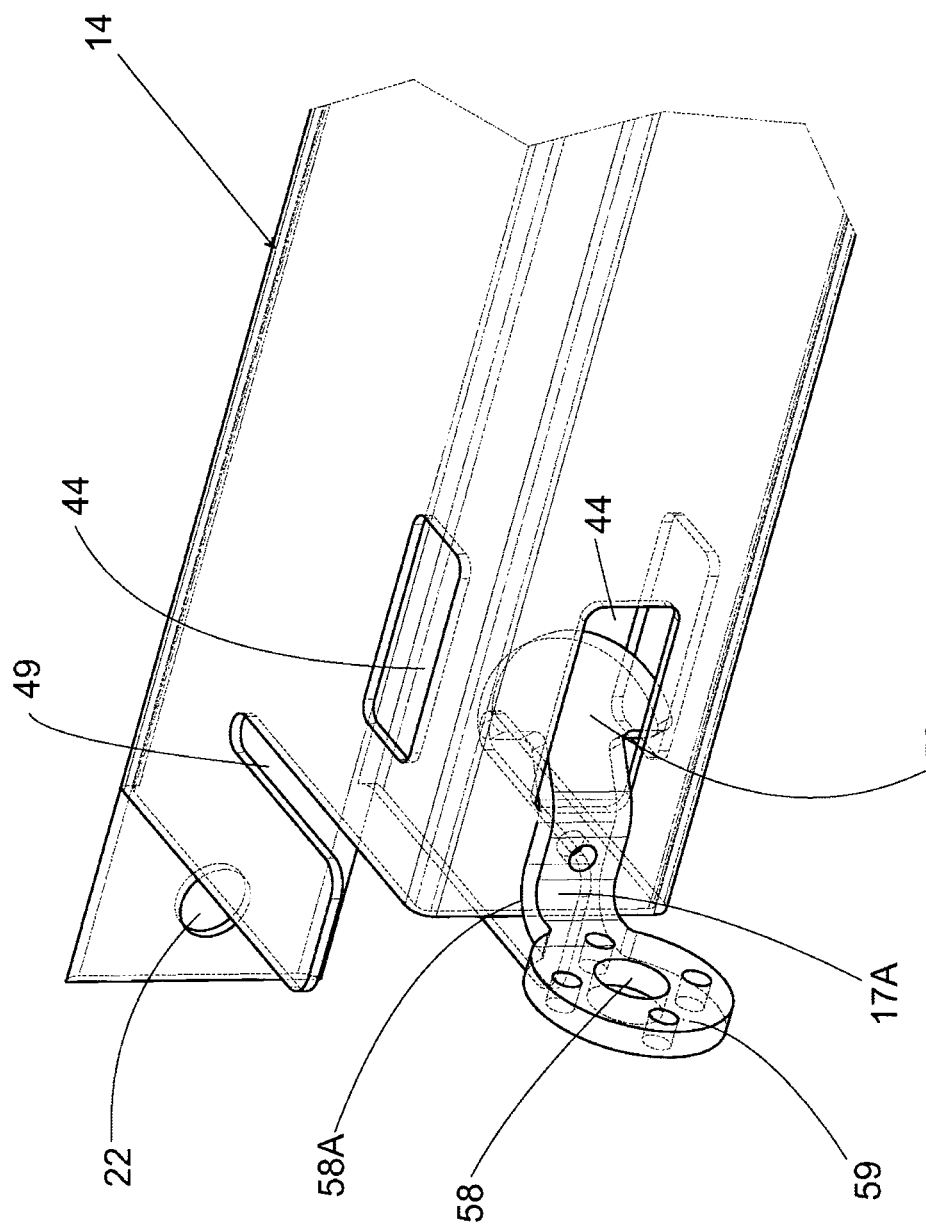
FIG. 20 shows use of a structural hook washer of the invention in relation to connection of adjacent structural members to each other.

FIG. 20 shows how hook washer 17A functions in practice whereby hook end 59 extends through an adjacent slot 44 as shown to attach a structural element such as girt 14 to another structural element such as column 12 (not shown). Structural element 14 has multiple slots 44 for versatility in use of hook washer 17A.

Figure 21:
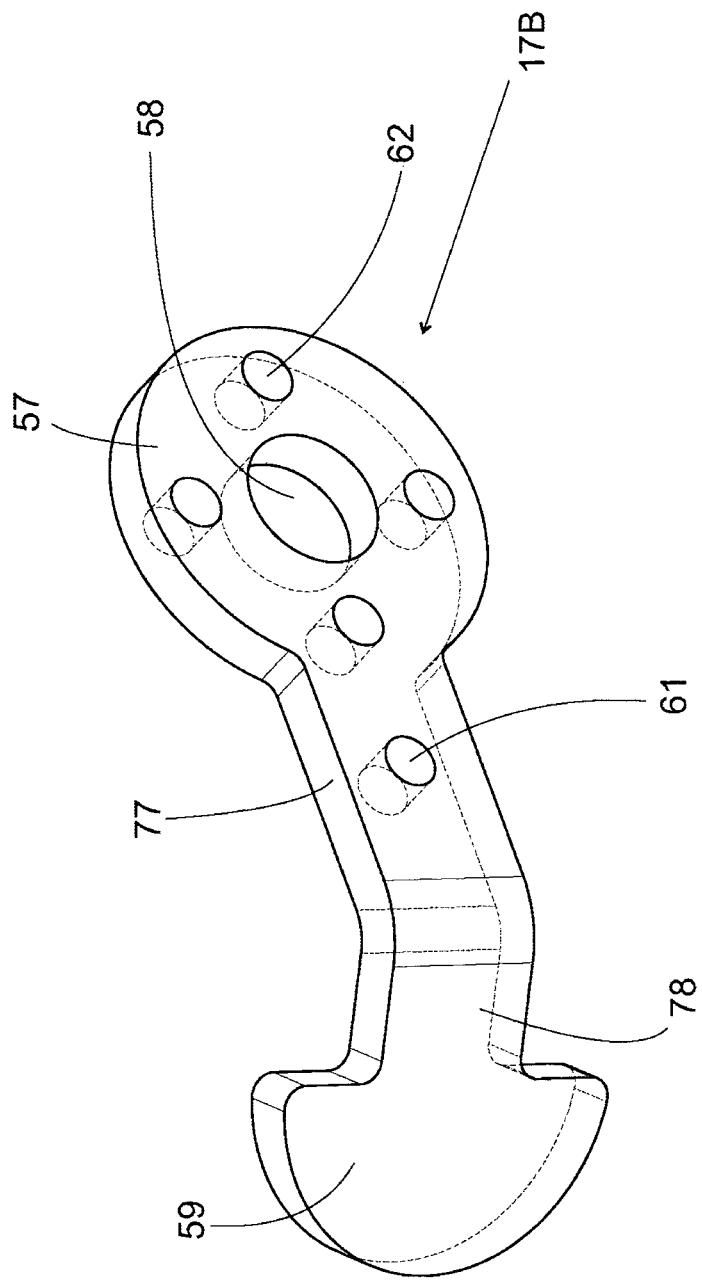
FIG. 21 shows use of an alternative fastener to that shown in FIGS. 17A and 17B, FIG. 18 and FIG. 19.

FIG. 21 refers to a modified hook washer 17B which is the same as hook washer 17A shown in FIG. 19 but wherein curved shank 58A has been replaced by angled shank parts 77 and 78 and a curved or bent portion 78A. Hook washers 17B can be used for connection of a pair of structural members together in line or in a collinear arrangement.

Figure 22:
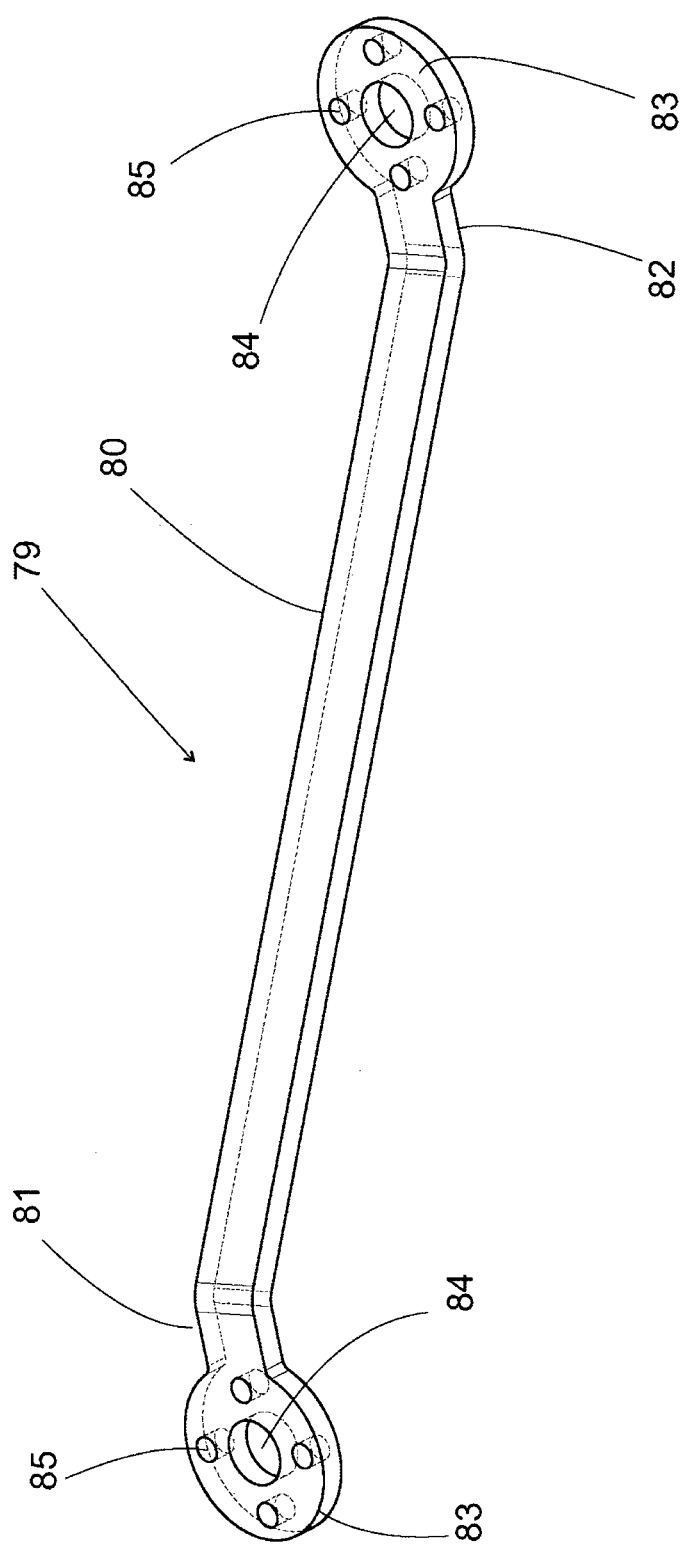
FIG. 22 shows an alternative fastener for use of the invention which is different to fasteners previously described.

FIG. 22 refers to another fastener or brace strap 79 having shank 80, angled ends 81 and 82 of shank 80 and round end parts 83 each having an aperture 84 and attachment apertures 85.

Figure 23:
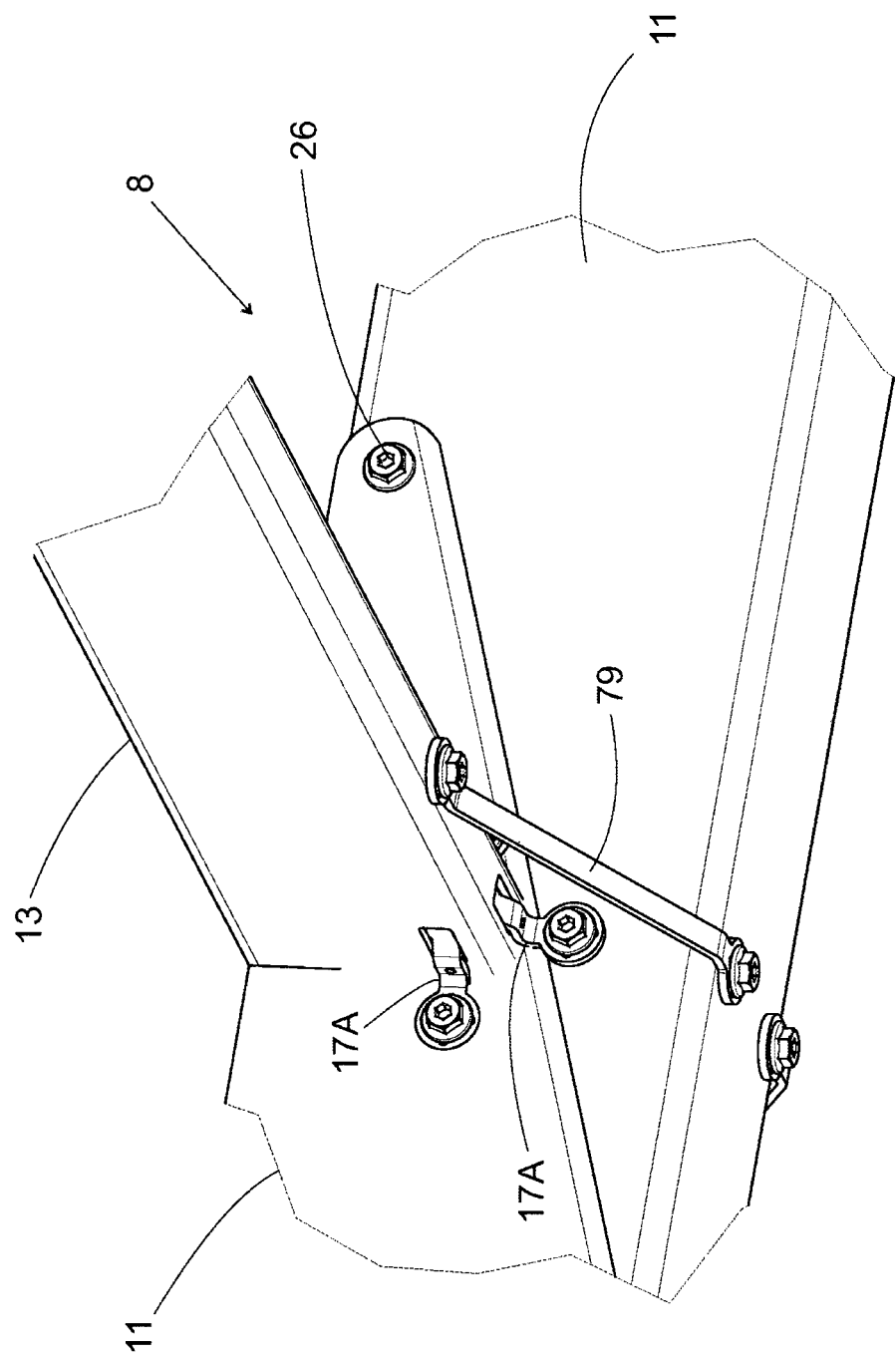
FIG. 23 shows use of a particular joint in interconnecting a rafter to an adjacent purlin within the region of the apex joint of the invention.

FIG. 23 refers to the use of fastener 79 in connection of rafter 11 with an adjacent purlin 13. There is also shown the use of washers 17A for use in connection of rafter 11 with purlin 13. There is also shown the use of fasteners 26 in connection of purlins 11 to each other in relation to joint 8.

Figure 24:
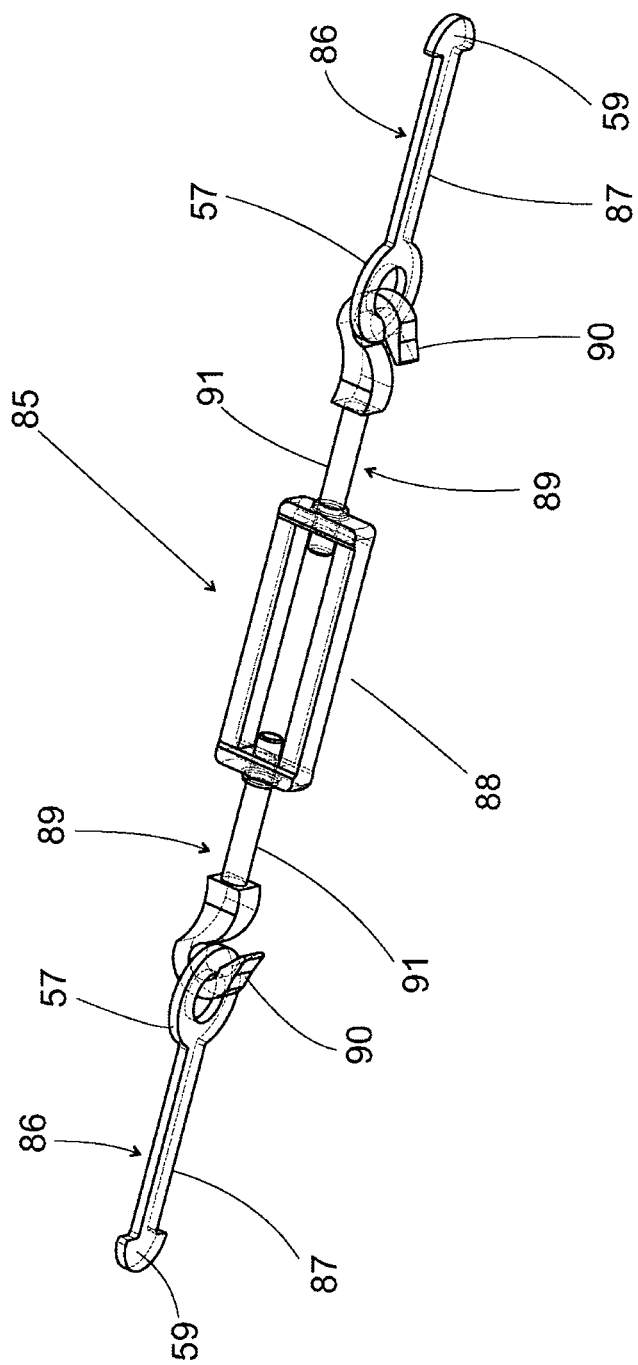
FIG. 24 shows use of another type of fastener for use in the invention which is different to those fasteners previously described.

FIG. 24 refers to an adjustable brace strap 85 having a pair of flat hook washers 86, turnbuckle 88, and intermediate hook members 89 each having curved hooks 90 and shank 91. Each of hook washers 86 has shank 87.

Figure 25:
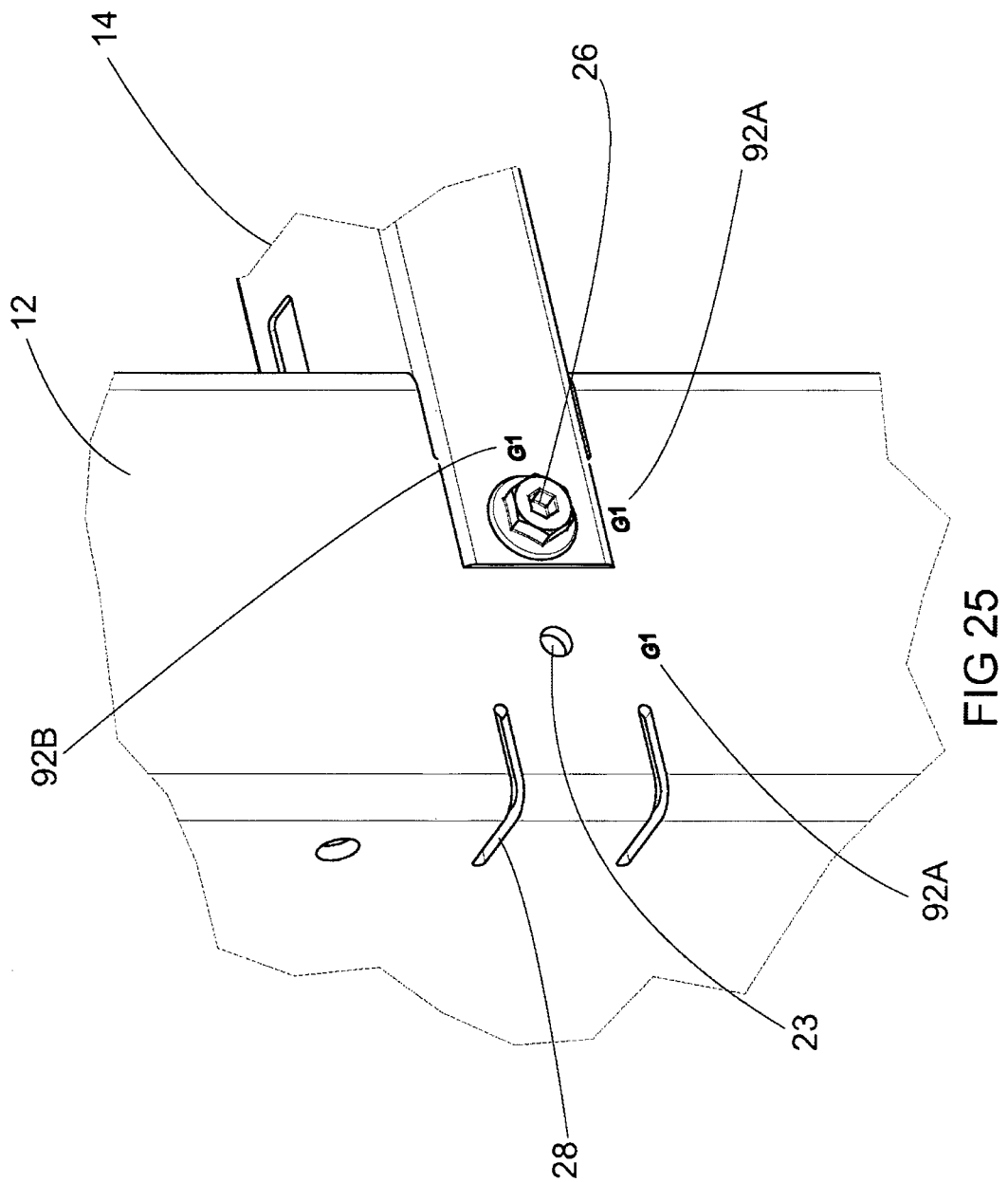
FIG. 25 shows the use of identifying marks in relation to correct location of assembly of a girt and an associated vertical column.

FIG. 25 refers to a girt 14 being attached to a column 12 wherein matching etched, cut or profiled identifiers 92A and 92B are used as locators for each of assembly and attachment of girt 14 to column 12.

Figure 26:
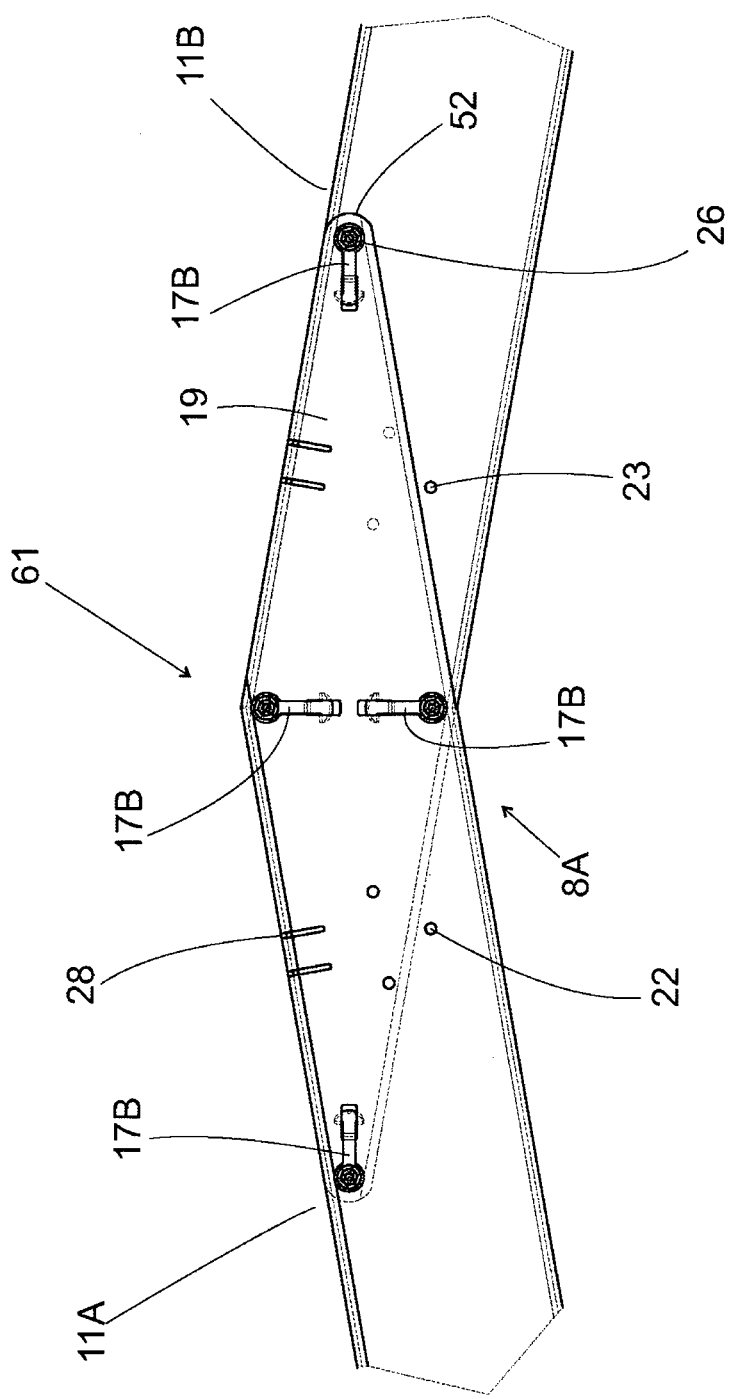
FIGS. 26, 27 and 28 show use of hook washers in regard to formation of the apex joint as described above rather than the use of fasteners such as bolts shown in FIGS. 17A and 17B.
Figure 27:
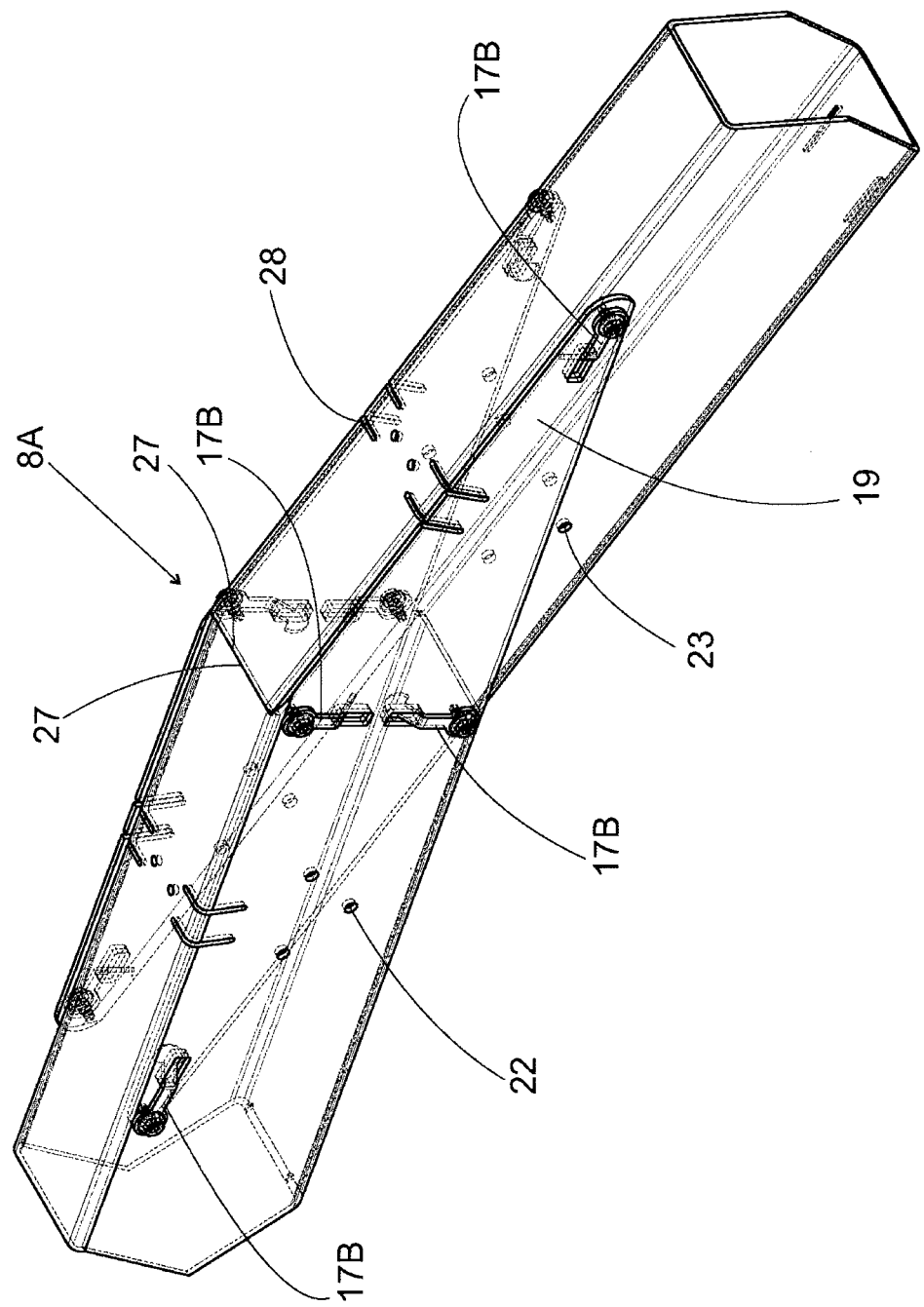
Figure 28:
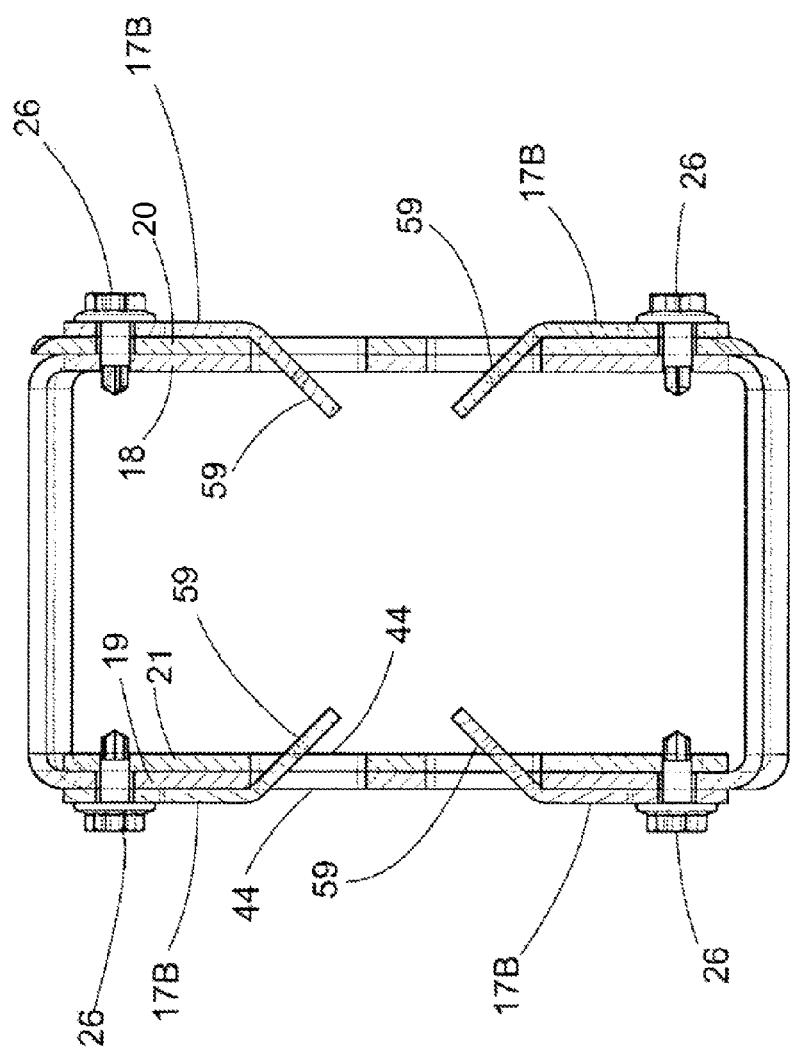

FIGS. 26-28 refer to a modified joint 8A in connection of adjacent purlins 11A and 11B which is similar to joint 8 shown in FIGS. 2, 3 and 4 with the exception that hook washers 17B are incorporated into the joint as well as fasteners 26 to increase the vertical shear moment strength of the joint in extreme or cyclonic load conditions and their associated slots 44 and on opposed sides as shown in FIG. 28 instead of fasteners 26. Hook washers 17B are also used to attach pointed ends 52 of adjacent tongues 18 and 19 and 20 and 21 to each other rather than fasteners 26. FIGS. 26-28 show mutually adjacent structural members 11A and 11B overlapping and offsetting each other, such that tongue 19 is located outwardly of tongue 21 and tongue 18 is located inwardly of tongue 20.

Figure 29:
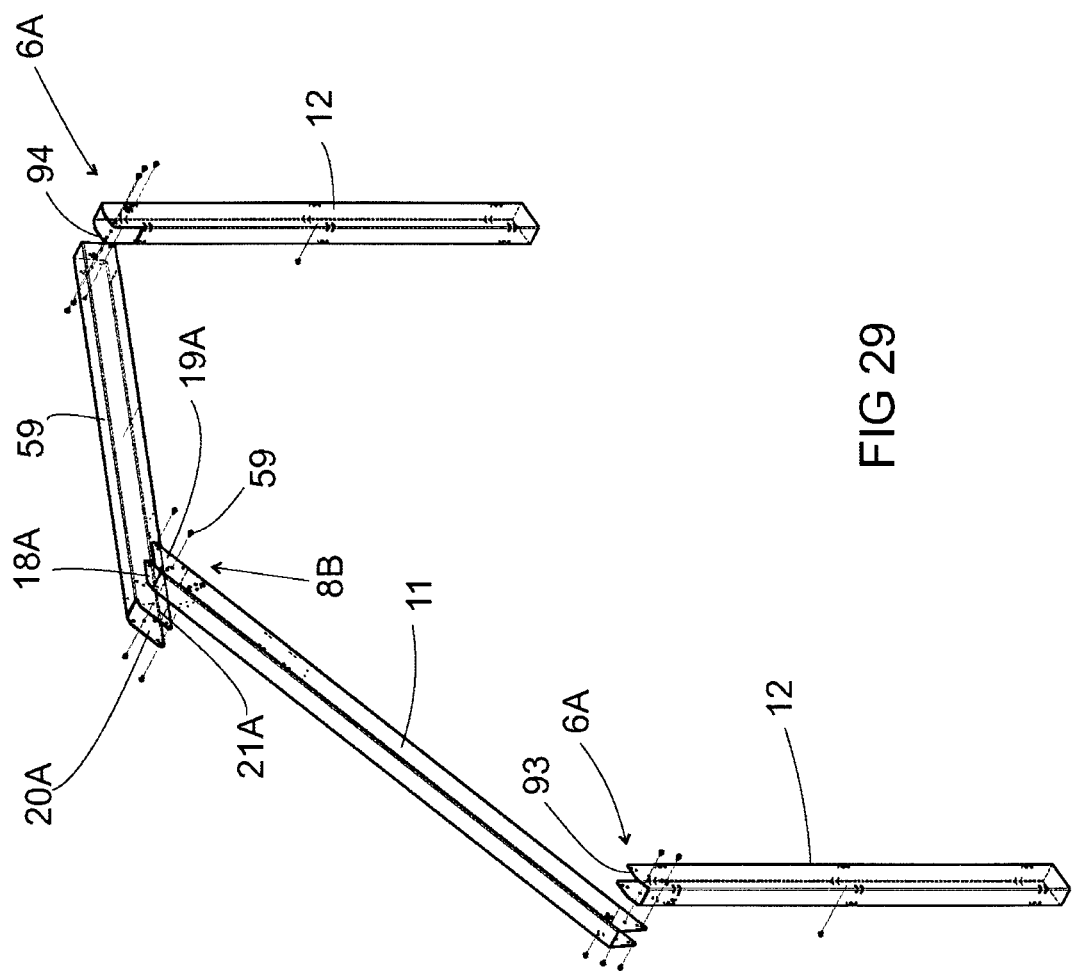
FIG. 29 illustrates how various angles of a rafter to a wall column and adjacent rafters to each other can be varied by the use of an array of apertures and also outwardly extending edges of adjacent structural members being cut so as to achieve the desired angle.

FIG. 29 shows another joint variation within the scope of the invention of a multiple angled joint 8B between adjacent rafters 11 wherein tongues 18A, 19A, 20A and 21A are inserted at a different angle to tongues 18, 29, 20 and 21 shown in FIGS. 2-3. A multiple angled joint 6A is also shown connecting purlins 11 to columns 12 where each column 12 has angled edges 93 and 94.

FIGS. 30, 31 and 32 show that aligned apertures 22 and 23 may be varied in location in relation to joint 6 wherein a variety of angles of inclination of rafters 11 in relation to columns 12 may be achieved. Thus there may be provided an array of apertures 22 and 23 so that a particular angle (α) of rafters 11 to columns 12 may be selected which may be between 5°-25°. FIG. 31 also shows how an array of apertures 22 and 23 to select a particular included angle (β) between adjacent rafters in relation to joint 8 which may be between 120°-170°.

Figure 33:
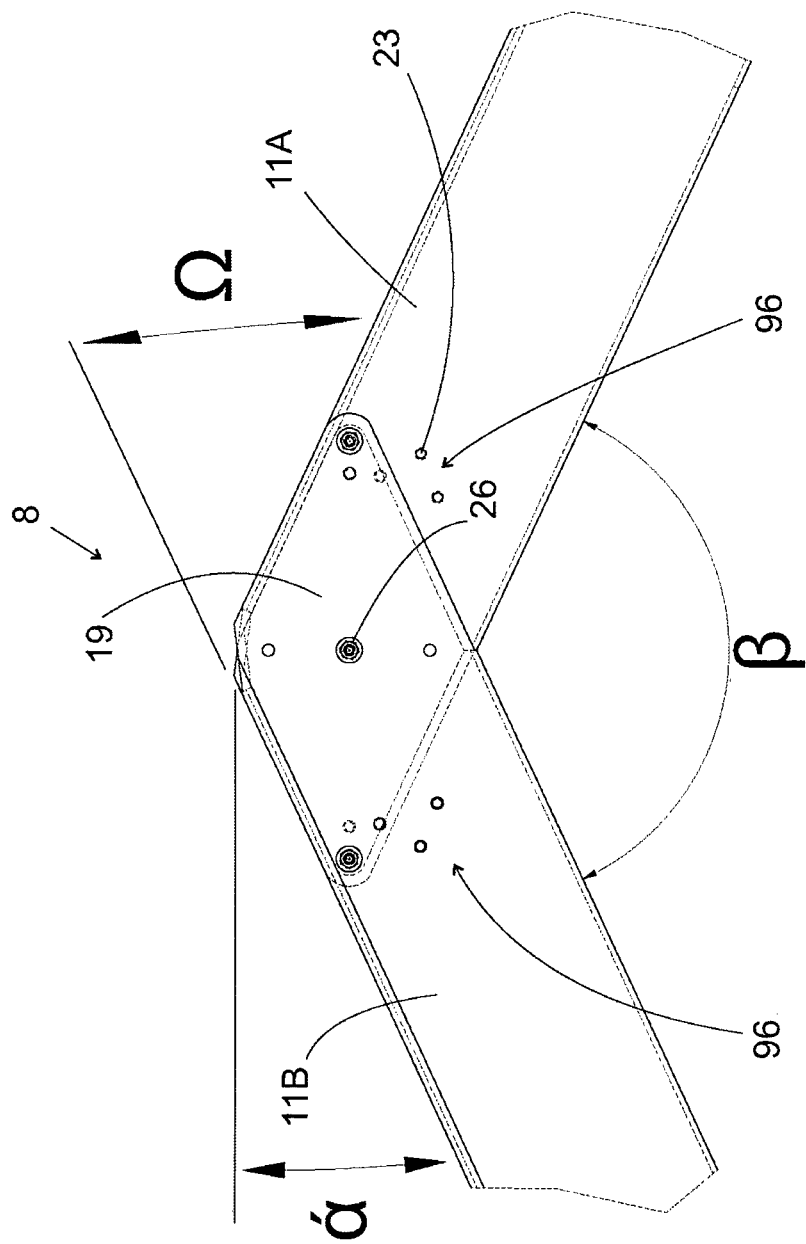

FIG. 33 shows that a particular array 96 of aligned apertures 22 and 23 may be used to provide an included angle of 130° between rafters 11.

Figure 34:
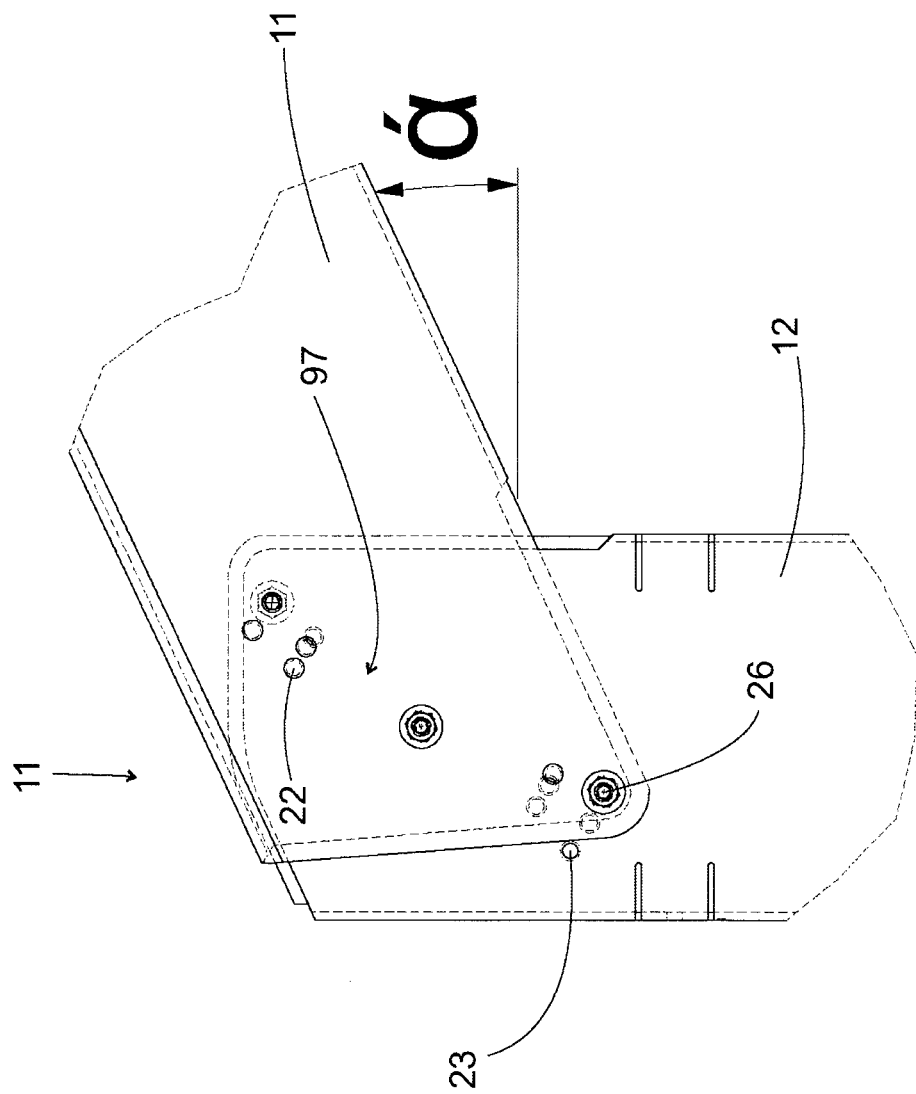
Figure 35:
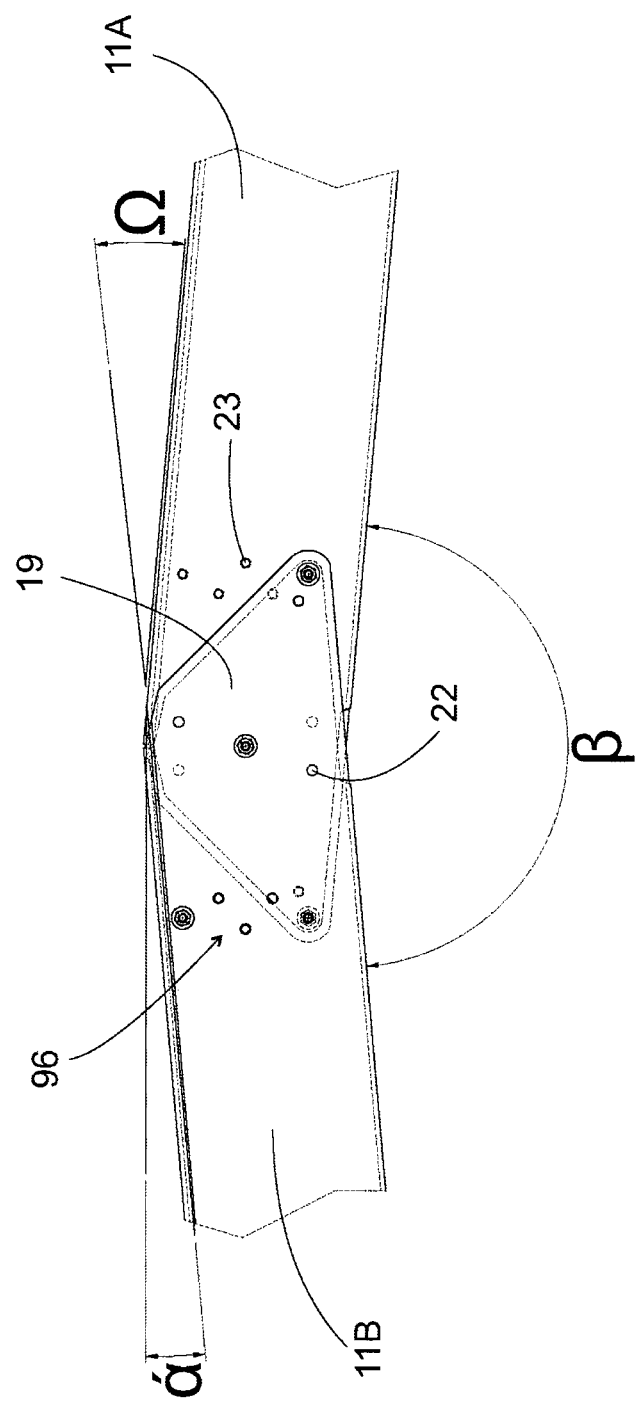
Figure 36:
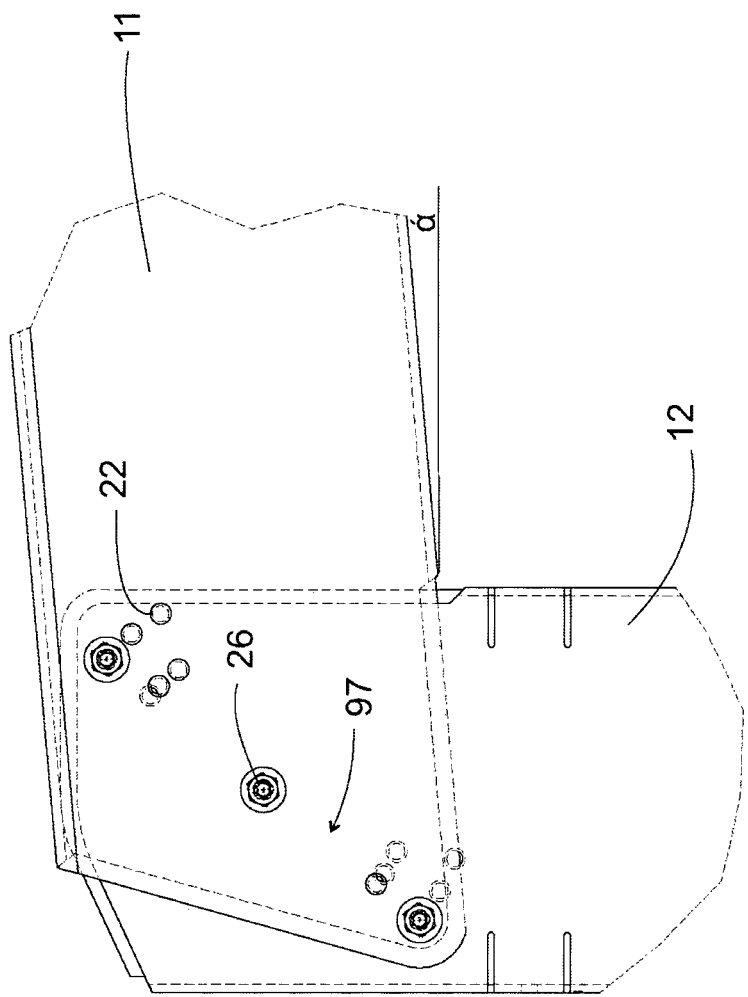

FIG. 34 shows in joint 11F that selection of particular apertures 22 and 23 in an array 97 of apertures 22 and 23 may provide an angle of 25° between rafter 11 and column 12. In similar manner FIGS. 35 and 36 refer to angle β being 150° and angle α being 5°. Angle Ω may also be determined as required.

Figure 37:
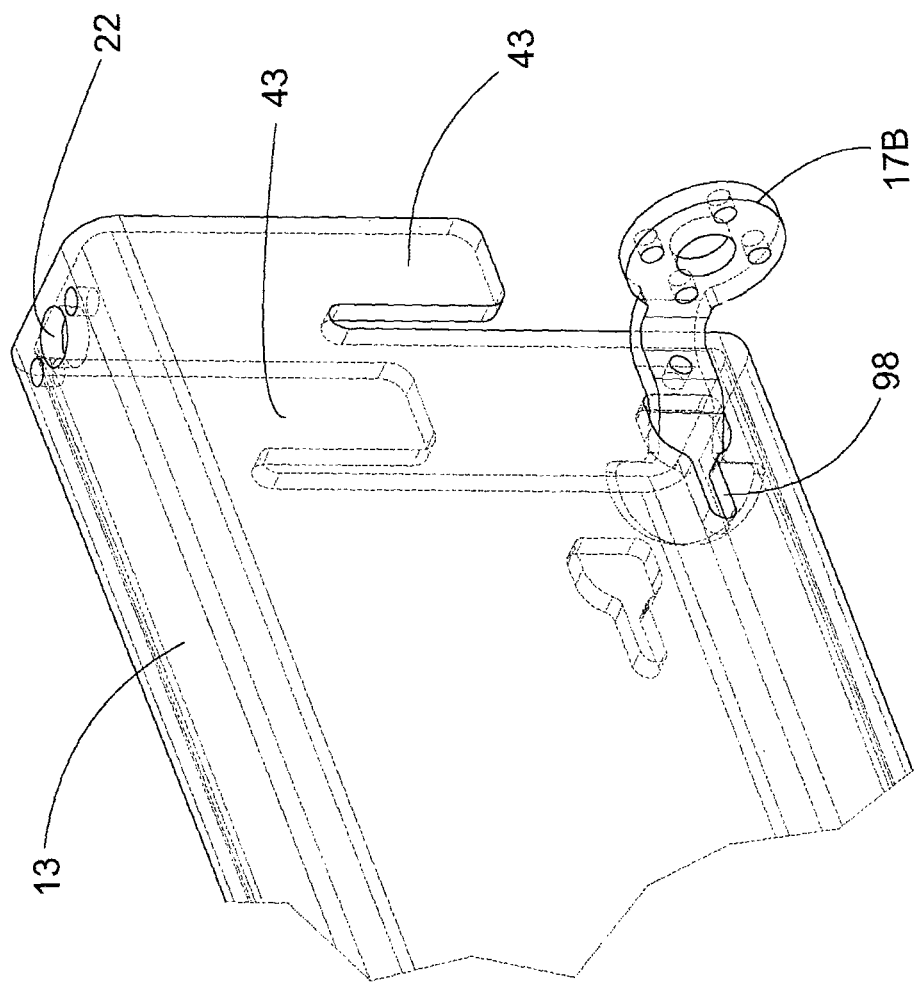

FIGS. 37-38 show use of a structural hook washer 17B which has been inserted into a keyhole shaped slot 98 instead of a rectangular slot 28 or 44. This has the advantage of leaving as much material around the head of the hook washer thus adding strength to the retaining of the hook washer within the purlin 13 element under load conditions. The rafter 13 is also provided with opposed tabs 43 for connection to an adjacent structural member (not shown).

FIG. 39 shows joint 9A in connection of purlin 13 to rafter 11 with one flange 99 of purlin 13 located externally of rafter 11 and an opposed flange 100 of purlin 13 located internally of rafter 11. Flange 100 engages in a mating slot 101 and is attached thereto by fasteners 26 through aligned apertures 22 and 23.

FIGS. 40 and 41 refer to a modified joint 9B between rafters 11 and purlins 13 wherein instead of parallel flanges 99 and 100 used in FIG. 39 use is made of an angled or offset flange 102. In this regard fasteners 26A may be used having a longer screw threaded shank 66A rather than shank 66 shown in FIG. 17A-17B.

Figure 43:
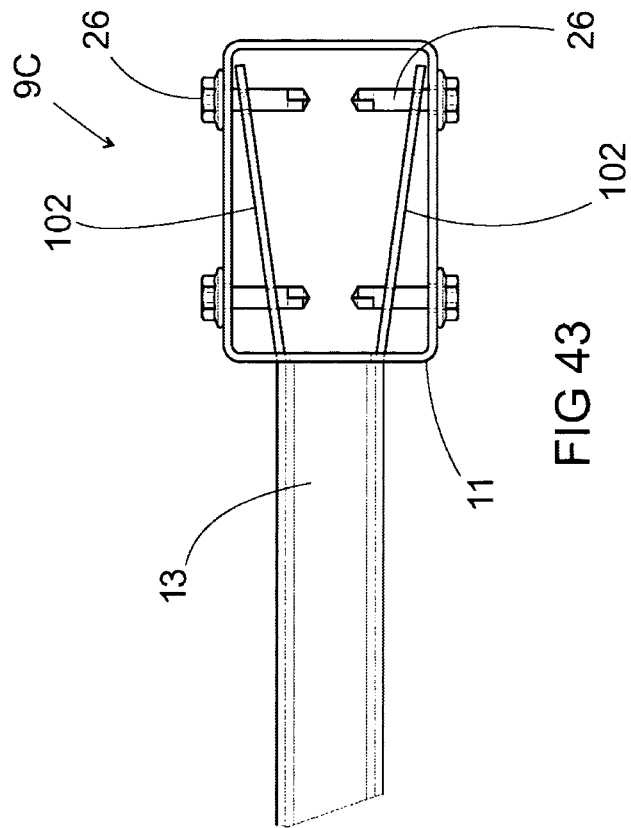
FIGS. 42 and 43 show another variation of the joint shown in FIG. 39.
Figure 42:
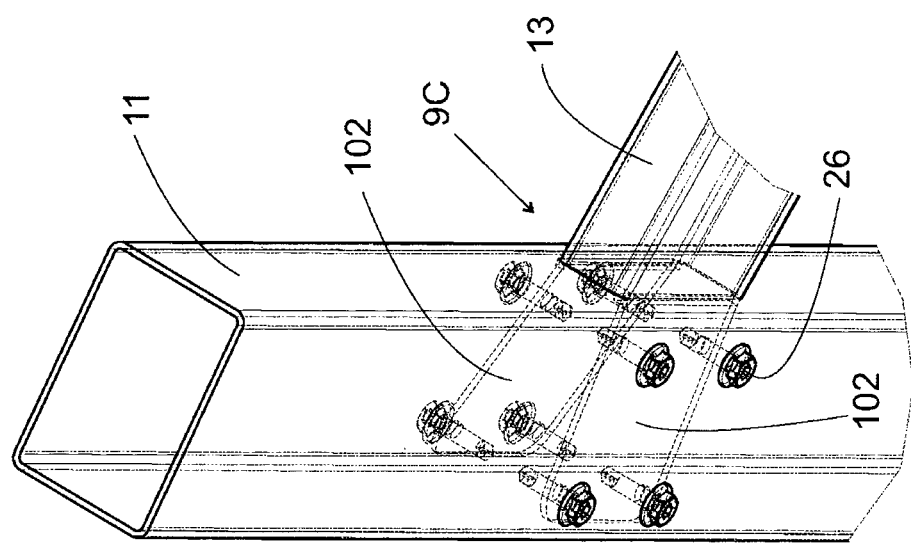

FIGS. 42 and 43 refer to a modified joint 9C wherein use is made of a pair of offset flanges 102 located internally of rafter 11 as shown in FIG. 43.

Both joints 9B and 9C have greater structural integrity by way of deformation of flanges 102 not being able to move or retreat from rafter 11 after attachment, using fasteners 26 or 26A.

Figure 44:
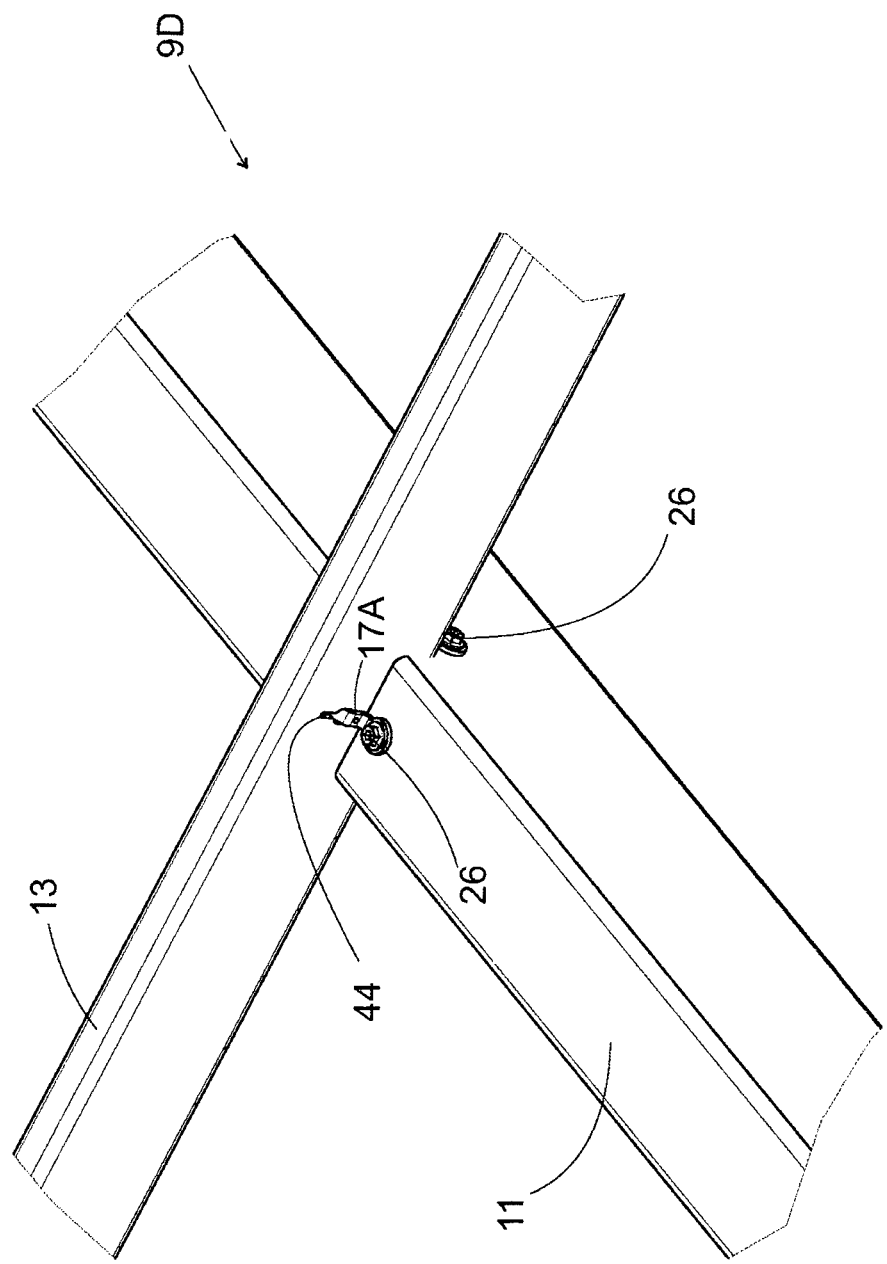
FIGS. 44, 45 and 46 illustrate attachment of a rafter to an adjacent purlin intermediate in length of both the rafter and the purlin.
Figure 45:
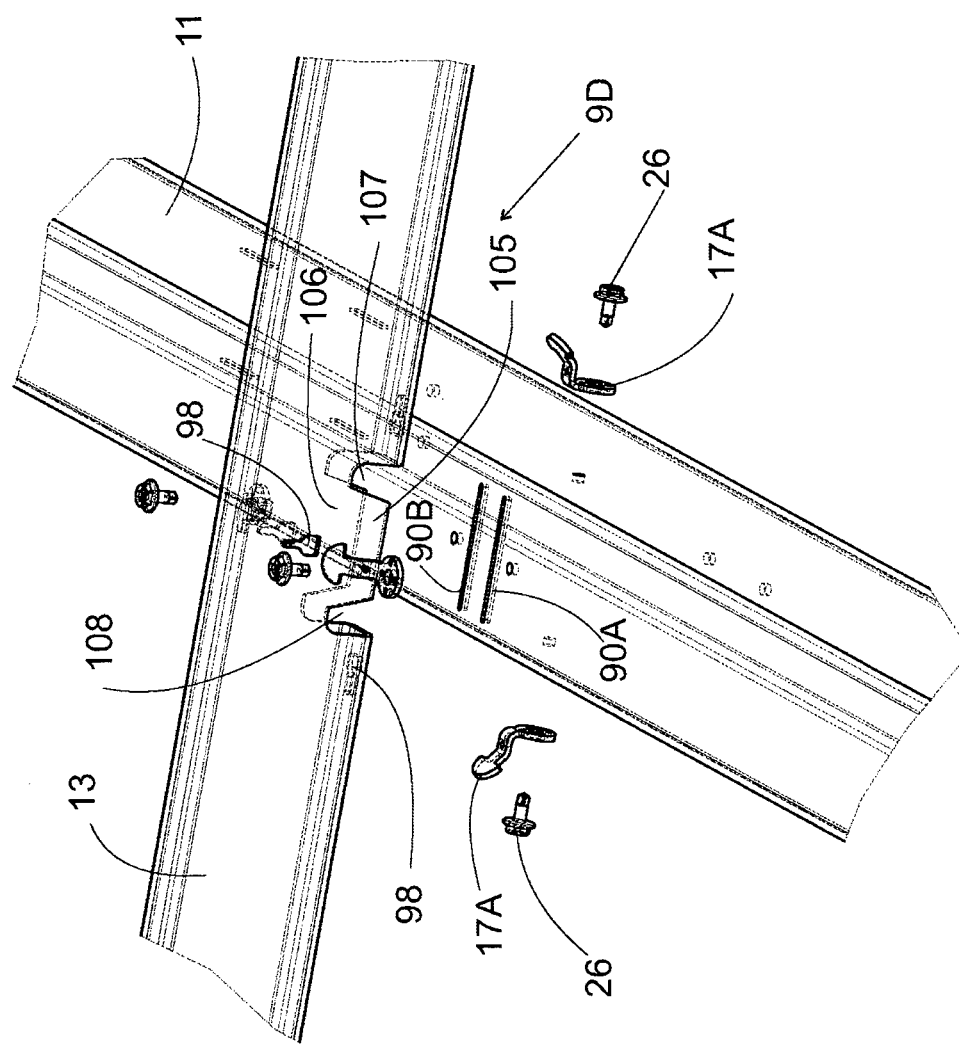
Figure 46:
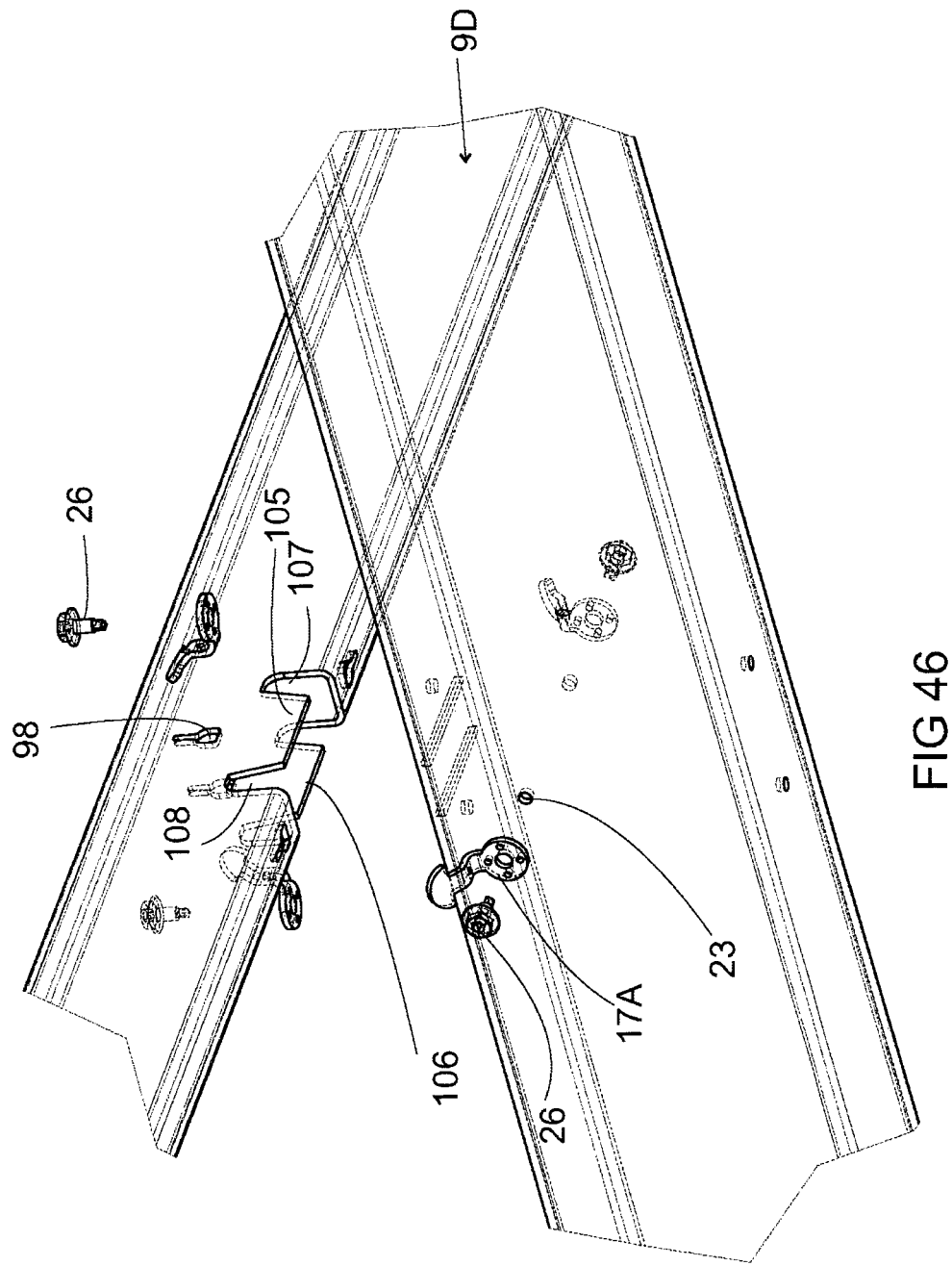

FIGS. 44-46 refer to interconnection of purlins 13 to rafters 11 using structural hook washer 17A which fits into mating slot 44 as described previously as shown in FIG. 44. Fastener 26 also completes the connection of purlins 13 to rafters 11. The resulting joint 9D can be used for connection of intermediate rafters 11 to purlins 13 (i.e. excluding both end rafters 11). Joint 9D can also be used to connect girts 14 to columns 12.

There is also shown in FIGS. 45-46 opposed lugs 105 and 106 which may be inserted into mating slots 90A and 90B and hook washers 17A also engage with lugs 105 and 106 by way of keyhole-shaped slot 98 or slot 44 (previously shown) to complete attachment of purlins 13 to rafters 11 with the assistance of fasteners 26 as shown.

Figure 47:
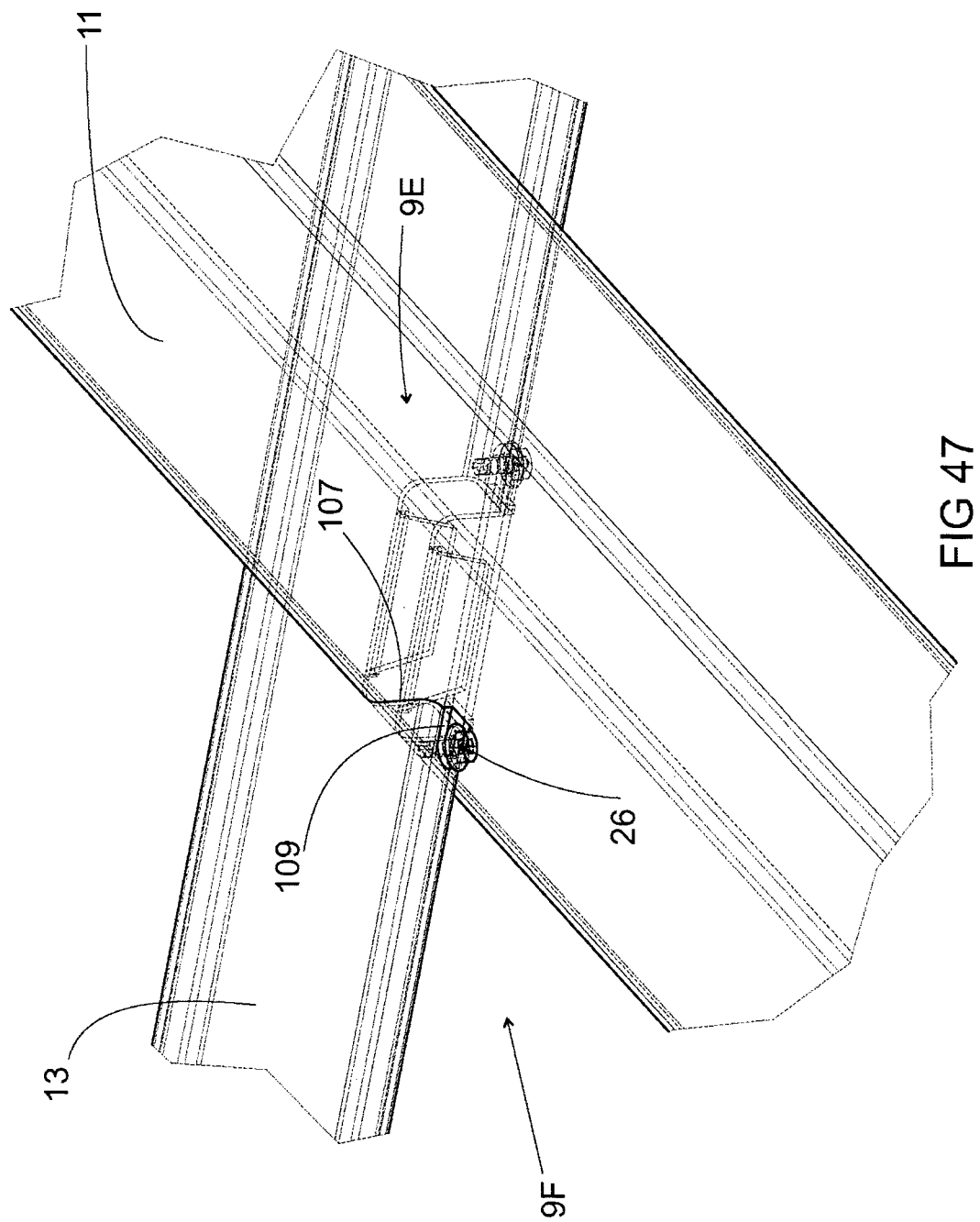
FIGS. 47 and 48 show use of a joint similar to that shown in FIGS. 44, 45 and 46 with use of an additional fastening component.
Figure 48:
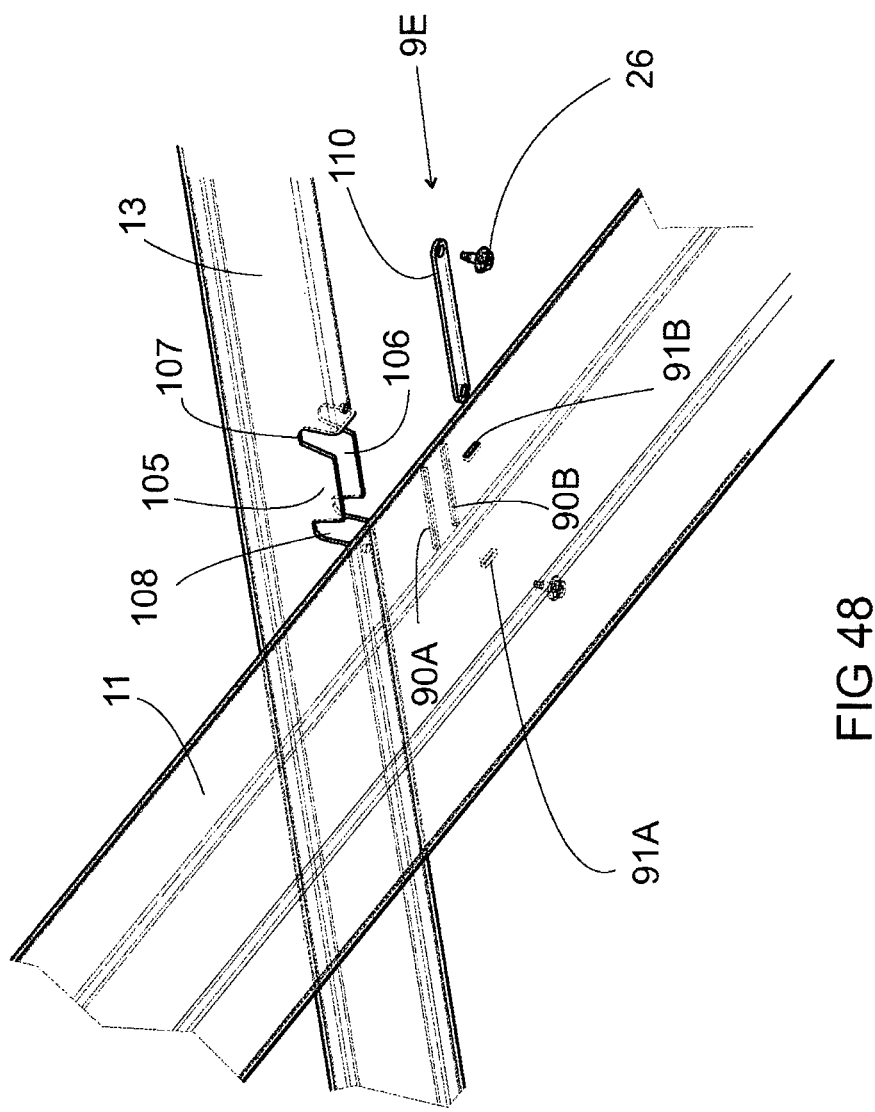

FIGS. 47-48 also show connection of rafters 11 to purlins 13 using joint 9E. Joint 9F is similar to joint 9D with the exception that elongate fastener or strap 109 is used instead of hook washers 17A to facilitate engagement of rafters 11 to purlins 13. Strap 109 has attachment apertures 110 which engage with fasteners 26. Strap 109 extends through slots 107 and 108 to reinforce joint 9D and fasteners 26 extend through slots 91A and 91B to complete attachment of strap 110 to joint 9E.

Figure 49:
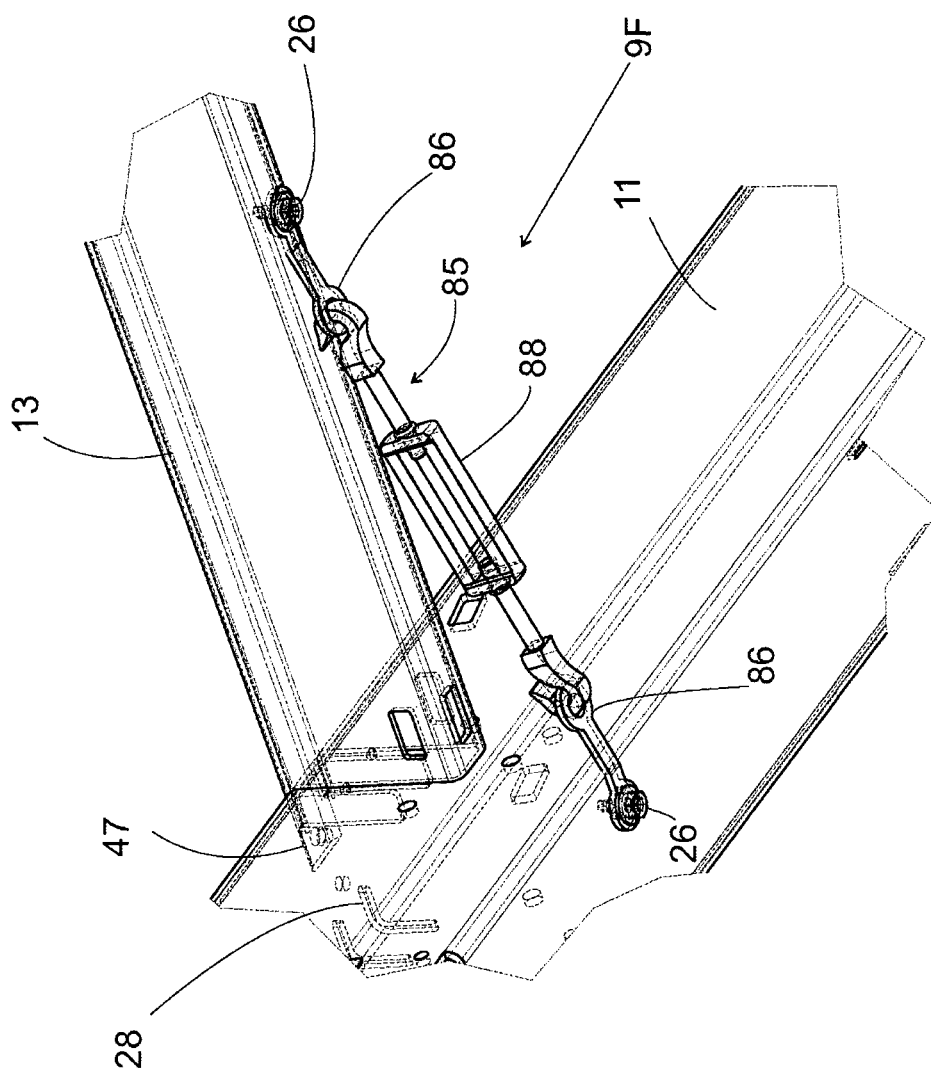
FIG. 49 shows use of a modified joint to that shown in FIGS. 47 and 48 using a different fastener.

FIG. 49 shows joint 9F similar to joint 7 shown in FIGS. 10 and 11 used in interconnecting rafters 11 to purlins 13. There is also shown the use of an adjustable brace strap assembly 85 shown in FIG. 24 providing additional support to joint 9F.

FIG. 50 shows use of a modified structural safety bolt 69 shown in FIG. 18 connecting associated structural members 122 and 123. FIG. 50 shows structural members 122 and 123 overlapping each other. FIG. 50 also shows structural members 122 and 123 offsetting each other. Near the nut 121, the tongue or projection of structural member 122 is located outwardly of the adjacent tongue or projection of structural member 123. Near the head 71 of bolt 69, the tongue or projection of structural member 122 is located inwardly of the adjacent tongue or projection of structural member 123.

Structural spacer bolt 69 passes through clearance holes 124, 125 and 126 and pilot hole 127 and self tapping thread 115 engages with pilot hole 127 locking structural members 122 and 123 to each other as shown. The locating shoulder 119 abuts an inner surface 128 of structural member 122 providing a shoulder constraint on structural member 122.

It will be appreciated from the above that joints shown in FIGS. 2-4, 8-9, 12-14, 26-28, 29, 30-36 and 39-43 are joints made in accordance with the invention.

From the foregoing it will be appreciated that joints 5, 6, 7, 8 and 9 as illustrated may be used in connection of any structural member inclusive of rafters 11, columns 12, purlins 13, girts 14, auxiliary posts 16 and horizontal cross members 17.

It will also be appreciated that while frame 10 is shown to have a rectangular culoidal structure that also may be arcuate or curved in plan or polygonal as may be required.

It will also be appreciated that the term "clearance holes" as used herein refer to an adjacent aperture through which a fastener may be inserted such as apertures 22 and the term "pilot holes" refers to an aperture behind the clearance hole such as apertures 23 which may be of lesser diameter. Thus pilot apertures or holes may have a diameter of 3 mm and clearance holes or apertures may have a diameter of 6 mm. However such diameters are only given by way of example.

It will also be realized that structural members 11, 12, 13, 14, 15, 16 and 17 may have any suitable length and may engage with each other at any point along their length.

Another feature of the invention is that any one of the above structural members may have curved ends or curved edges along with a particular array of aligned apertures 22 and 23 to provide any suitable angle between adjacent structural members.

From the foregoing it will be realized that a variety of different fasteners 26, 26A, 17A, 17B, 69, 79, 85 and 110 may be used in interconnection of adjacent structural members inclusive of rafters 11, columns 12, purlins 13, girts 14, auxiliary posts 16 and horizontal cross members 17.

It will also be realized that clearance holes 22 as described herein may be located at a base or foot end of columns 12 or auxiliary posts 16 for the purpose of connection to footing plates (not shown) for connection to a concrete slab or other support member.

The invention also includes within its scope an assembly of an elongated hook washer and a pair of mutually adjacent structural members wherein each structural member has a pair of opposed walls and said structural members are selected from RHS and channel shaped structural members, said elongated hook washer having a curved shank having a pair of ends wherein one end of the shank has an enlarged head having a pair of edges normal to the shank which are inserted into an adjacent slot of an adjoining structural member and another end of the shank including an attachment aperture having a fastener inserted into said attachment aperture that extends into another adjoining structural member.

The claims defining the invention are as follow:

1. A joint for connection of mutually adjacent structural members, each of the structural members is formed of a rectangular hollow structural section having a pair of major opposed walls, a pair of minor opposed walls, and open ends, wherein first and second parts of one structural member are directly attached to respective first and second parts of another structural member without the use of connecting brackets, whereby in formation of said joint said parts of said structural members overlap and offset each other such that the first part of said one structural member is located outwardly of the first part of said another structural member and the second part of said one structural member is located inwardly of the second part of said another structural member, whereby each of the major opposed walls of said one structural member has a face located adjacent to and overlapping a face of each of the major opposed walls of said another structural member and connected thereto by a plurality of fasteners wherein said joint is selected from (i) each of the major opposed walls of said one structural member or each of the major opposed walls of said another structural member comprise a pair of outwardly extending tongues or projections formed by removing a portion of one or both of the minor opposed walls and conforming one or both of the major opposed walls to a desired angle of said joint; or (ii) there is provided a slot in one of the minor opposed walls interconnecting said major opposed walls of said one structural member to facilitate insertion of a tongue or projection of the another structural member within said slot.

2. The joint as claimed in claim 1 wherein in case (i) each major opposed wall of said one structural member and each major opposed wall of said another structural member comprise a pair of outwardly extending tongues or projections.

3. The joint as claimed in claim 2 which forms an apex joint for connection of said mutually adjacent structural members which are each upwardly extending and obliquely orientated to each other.

4. The joint as claimed in claim 3 wherein in the apex joint an included angle between the upper ends of each structural member may be varied between 120-170 degrees and this is achieved by providing an angled cut on each pair of major opposed walls and/or using a particular array of aligned apertures in each proximal minor opposed wall.

5. The joint as claimed in claim 3 wherein each of the tongues or projections is triangular in shape.

6. The joint as claimed in claim 5 wherein each of the tongues or projections is in the shape of a right angled triangle.

7. The joint as claimed in claim 1 wherein in case (i) there is only provided a single pair of outwardly extending tongues or projections.

8. The joint as claimed in claim 1 wherein said pair of opposed walls of each structural member are located at mutually adjoining ends of each structural member.

9. The joint as claimed in claim 1 wherein each structural member has a square cross sectional shape.

10. The joint as claimed in claim 1 wherein each major opposed wall of said one structural member is in substantial abutment with the major opposed wall of said another structural member.

11. The joint as claimed in claim 1 wherein in case (ii) said one structural member forms a horizontal member and said another structural member forms a vertical member and each major opposed wall of said one structural member and said another structural member are orientated in a vertical plane and there is provided a horizontal slot in a minor opposed wall of said one structural member and a vertical slot in a minor opposed wall of said another structural member to facilitate formation of said joint.

12. The joint as claimed in claim 11 wherein said horizontal slot forms only part of said minor opposed wall and said vertical slot forms only part of said minor opposed wall of said another structural member.

13. The joint as claimed in claim 1 wherein each major opposed wall of said one structural member is attached to the major opposed wall of said another structural members by fasteners that extend through aligned apertures in each opposed wall.

14. The joint as claimed in claim 1 wherein each major opposed wall of said one structural member is attached to the major opposed wall of said another structural members by additional fasteners inclusive of hook washers that extend through adjacent slots in each of said one structural member and said another structural member.

15. The joint as claimed in claim 1 wherein each major opposed wall of said one structural member is spaced from an opposed wall of said another structural member.

16. The joint as claimed in claim 1 where each major opposed wall of said one structural member is angled with respect to the opposed wall of said another structural member.

17. The joint as claimed in claim 1 wherein one of each of the major opposed walls of said one structural member is angled in relation to the major opposed wall of said another structural member.

18. A building frame which incorporates the joint of claim 1.

19. The building frame of claim 18 which forms a portal frame having a pair of upright frame members connected to an adjacent upwardly extending structural or frame member.

20. The building frame of claim 18 further including a side joint between an upright frame member and a bottom end of an upwardly extending frame member which comprises one of the upright frame member or upwardly extending frame member with one or more tabs which are aligned with corresponding slot(s) in the other of the upright frame member or upwardly extending frame member which are retained therein by fasteners extending through aligned apertures in each frame member.

21. The building frame as claimed in claim 18 wherein a side joint is formed between an upright frame member and a bottom end of an upwardly extending frame member wherein one of the upright frame member or upwardly extending frame member has an outwardly extending tab which overlies the adjacent surface of the other frame member which is attached thereto by fasteners.

22. An assembly of an elongated hook washer and a pair of mutually adjacent structural members wherein each of the structural members is formed of a rectangular hollow structural section having first and second opposed walls and opened ends, said elongated hook washer having a curved shank having a pair of ends wherein one end of the shank has a head having a pair of edges extending normal to the shank, the head extending outwardly from the shank, the pair of edges are inserted into an adjacent slot of an adjoining structural member and another end of the shank including an attachment aperture having a fastener inserted into said attachment aperture that extends into another adjoining structural member, wherein each of the first and second opposed walls of said adjoining structural member has a face located adjacent to a face of each of the first and second opposed walls of said another adjoining structural member when connected by said elongated hook washer, and wherein said mutually adjacent structural members overlap and offset each other, such that the first opposed wall of said one structural member is located outwardly of the first opposed wall of said another structural member and the second opposed wall of said one structural member is located inwardly of the second opposed wall of said another structural member.

23. A joint for connection of mutually adjacent structural members, each of the structural members is formed from a rectangular hollow structural section having a pair of opposed walls and open ends, wherein first and second parts of one structural member are directly attached to respective first and second parts of another structural member without the use of connecting brackets whereby in formation of said joint each of the opposed walls of said one structural member has a face located adjacent to a face of each of the opposed walls of said another structural member and connected thereto by a plurality of fasteners and wherein said joint is selected from (i) each of the opposed walls of said one structural member or each of the opposed walls of said another structural member comprise a pair of outwardly extending tongues or projections wherein said outwardly extending tongues or projections are formed by end extensions of each of the opposed walls of said one structural member or said another structural member, wherein each tongue or projection is triangular in shape and has a plurality of attachment apertures for engagement by said fasteners, and wherein said parts of said mutually adjacent structural members overlap and offset each other, such that the first of said one structural member is located outwardly of the first adjacent of said another structural member and the second of said one structural member is located inwardly of the second adjacent of said another structural member; or (ii) there is provided a slot in a web interconnecting said opposed walls of said one structural member to facilitate insertion of a tongue or projection of the another structural member within said slot.

* * * * *